(12) United States Patent
Wei

(10) Patent No.: US 12,487,916 B2
(45) Date of Patent: Dec. 2, 2025

(54) READ AND WRITE ADDRESS TRANSLATION USING RESERVED MEMORY PAGES FOR MULTI-PAGE TRANSLATION UNITS

(71) Applicant: Micron Technology, Inc., Boise, ID (US)

(72) Inventor: Meng Wei, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 16 days.

(21) Appl. No.: 18/475,966

(22) Filed: Sep. 27, 2023

(65) Prior Publication Data

US 2024/0152449 A1 May 9, 2024

(30) Foreign Application Priority Data

Nov. 8, 2022 (CN) .......................... 202211389827.7

(51) Int. Cl.
*G06F 12/02* (2006.01)
*G06F 12/1009* (2016.01)

(52) U.S. Cl.
CPC .................................. *G06F 12/023* (2013.01)

(58) Field of Classification Search
CPC ............... G06F 12/023; G06F 12/0246; G06F 2212/7201
USPC .......................................................... 711/154
See application file for complete search history.

(56) References Cited

U.S. PATENT DOCUMENTS

| | | | | |
|---|---|---|---|---|
| 2010/0017650 | A1* | 1/2010 | Chin | G06F 11/108 710/22 |
| 2011/0035538 | A1* | 2/2011 | Kim | G11C 16/10 711/E12.001 |
| 2014/0089565 | A1* | 3/2014 | Lee | G06F 3/061 711/103 |
| 2019/0369908 | A1* | 12/2019 | Koo | G06F 3/0659 |
| 2021/0042201 | A1* | 2/2021 | Byun | G06F 11/2094 |

* cited by examiner

*Primary Examiner* — Arpan P. Savla
*Assistant Examiner* — Sidney Li
(74) *Attorney, Agent, or Firm* — Harrity & Harrity, LLP

(57) ABSTRACT

In some implementations, a memory device may receive a write command that includes data to be written to multiple memory pages of a translation unit (TU) of the memory device. The multiple memory pages of the TU may span multiple memory planes of the memory device. The memory device may identify the multiple memory pages of the TU, to which the data is to be written, based on one or more bad blocks of the memory device and a determination of whether one or more memory pages of the memory device are to be reserved. The memory device may write the data to the multiple memory pages of the TU.

20 Claims, 20 Drawing Sheets

| TU | Page |
|---|---|
| TU 1 | Die 1, Plane 2, Block 3, Page 1 |
| TU 2 | Die 3, Plane 1, Block 6, Page 7 |
| TU 3 | Die 4, Plane 5, Block 2, Page 4 |
| ... | ... |

L2P Table

FIG. 4

READ AND WRITE ADDRESS TRANSLATION USING RESERVED MEMORY PAGES FOR MULTI-PAGE TRANSLATION UNITS

CROSS-REFERENCE TO RELATED APPLICATION

This Patent application claims priority to Chinese Patent Application No. 202211389827.7, filed on Nov. 8, 2022, entitled "READ AND WRITE ADDRESS TRANSLATION USING RESERVED MEMORY PAGES FOR MULTI-PAGE TRANSLATION UNITS," which is hereby expressly incorporated by reference herein.

TECHNICAL FIELD

The present disclosure generally relates to memory devices, memory device operations, and, for example, to read and write address translation using reserved memory pages for multi-page translation units.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

BRIEF DESCRIPTION OF THE DRAWINGS

FIG. 4 is a diagram illustrating an example of memory address translation.

DETAILED DESCRIPTION

Figure 1:
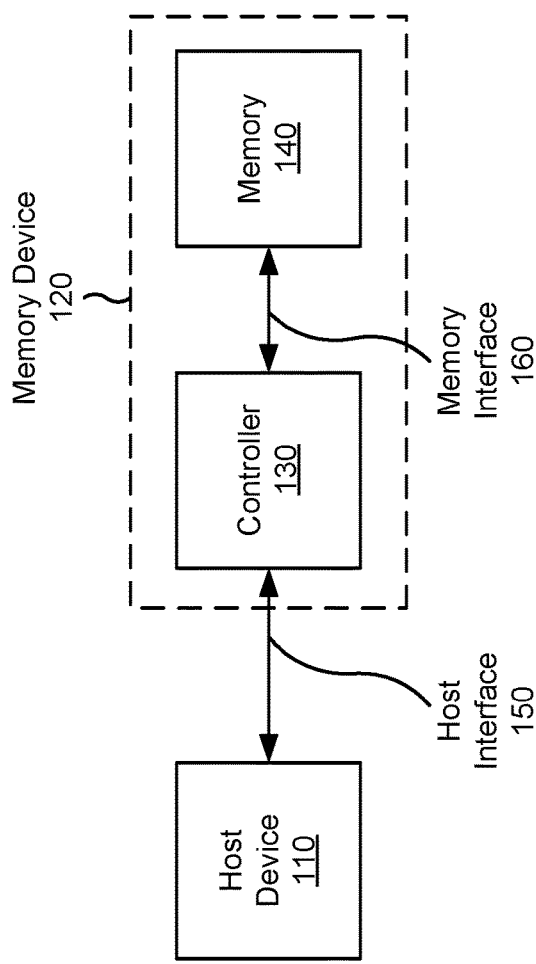
FIG. 1 is a diagram illustrating an example system capable of read and write address translation using reserved memory pages for multi-page translation units.

As storage capacity of non-volatile memory devices, such as solid state drives (SSDs), increases, those non-volatile memory devices require an increasing amount of volatile memory, such as DRAM, to enable fast performance of various memory operations, such as logical-to-physical (L2P) address translation. For example, one or more L2P address tables may be stored in and accessed from DRAM to enable faster memory translation than accessing those L2P address tables from non-volatile memory, such as NAND memory. Larger capacity SSDs have more physical addresses where data can be stored, and so a larger L2P table is needed to store a larger quantity of logical address to physical address mappings. This requirement for increased DRAM as SSD storage capacity increases results in a larger SSD physical size (e.g., due to both larger capacity non-volatile memory and corresponding larger capacity volatile memory), consumes additional power to maintain and operate the DRAM (e.g., for refresh operations), and results in increased manufacturing costs. Reducing a required size of the DRAM (e.g., for a given SSD capacity) would reduce a physical footprint of the SSD, would reduce power consumption of the SSD, and would reduce costs to manufacture and operate the SSD.

One technique to reduce DRAM size is to use L2P table swapping, where only a portion of the L2P table is stored in DRAM, and the remaining portion of the L2P table is stored in NAND memory. However, this technique requires additional memory operations (as compared to storing the entire L2P table in DRAM) to write portions of the L2P table from DRAM to NAND and to read portions of the L2P table from NAND to DRAM. This increases the latency of L2P address translation and corresponding read and write operations, wears out the memory device more quickly, and causes write amplification issues, particularly in SSDs that operate in a write-intensive environment.

Another technique to reduce DRAM size is to use a large translation unit (TU) size. A TU is a logical memory unit that may correspond to a single logical block address (LBA) indicated in a host command, or that may correspond to multiple LBAs. An L2P table entry may map a single logical TU to a single physical memory page (or a portion of the single physical memory page). Thus, the maximum size of a TU may be limited by the page size of the memory device. For example, if a TU has a size of 4 kilobytes, and each L2P table entry includes a mapping of a single TU to a single physical address, then each L2P table entry maps to 4 kilobytes of user data. If the page size is 16 kilobytes, then the TU size can be increased to 16 kilobytes, which results in one-fourth as many L2P table entries in DRAM as compared to a 4 kilobyte TU size. However, this may still result in a DRAM size that is larger than desired.

Increasing the TU size to be larger than the page size of the memory device would result in a smaller DRAM size required for storage of the L2P table. However, this presents several challenges. For example, increasing the TU size to be larger than the page size would result in L2P table entries that map a single TU to multiple pages (called a "multi-page TU"). If each of the multiple pages is indicated in the L2P table, then this does not help to reduce the size of the L2P table. Instead, the size of the L2P table could be reduce by indicating only a single page included in a multi-page TU. However, the memory device would then need to determine the additional pages included in the multi-page TU, which is challenging because pages are not always sequential. For example, pages of a multi-page TU could be included in different memory planes, different page stripes, and/or different block stripes (e.g., to achieve good memory utilization). Furthermore, some pages may be bad (e.g., may be included in a bad block or a bad plane), which would alter the L2P mapping.

Some implementations described herein enable read and write address translation for multi-page TUs. In some implementations, a memory device may dynamically reserve and/or unreserve memory pages to exclude or include, respectively, those memory pages from a multi-page TU. A reserved memory page is sometimes called a "virtually retired" memory page, and reserving a memory page (or marking a memory page as reserved) may be referred to as "virtually retiring" the memory page. Similarly, an unreserved memory page is sometimes called a "virtually unretired" memory page, and un-reserving a memory page (or marking a memory page as unserved) may be referred to as "virtually unretiring" the memory page. The memory device may reserve or unreserve memory pages to improve speed and reduce processing power required for read and write address translation. As a result, multi-page TUs may be effectively used by the memory device, resulting in a smaller L2P table and smaller DRAM, which reduces a physical footprint of the memory device, reduces power consumption of the memory device needed for DRAM operations and maintenance, and reduces costs to manufacture and operate the memory device.

FIG. 1 is a diagram illustrating an example system 100 capable of read and write address translation using reserved memory pages for multi-page translation units. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to identify a translation unit (TU) associated with a read command, wherein the TU includes multiple memory pages that span multiple memory planes of the memory device; identify an initial memory page of the multiple memory pages of the TU based on a logical-to-physical mapping table; identify one or more additional memory pages of the multiple memory pages of the TU based on the initial memory page and based on at least one of: an indication of one or more bad blocks of the memory device, or an index value that identifies the initial memory page or that identifies a memory plane, of the multiple memory planes, that includes the initial memory page; and read data from the initial memory page and the one or more additional memory pages included in the TU.

In some implementations, the memory device 120 and/or the controller 130 may be configured to identify a TU associated with a read command, wherein the TU includes multiple memory pages that span multiple memory planes of the memory device; identify an initial memory page of the multiple memory pages of the TU based on a logical-to-physical mapping table, wherein the initial memory page is included in a first memory plane of the multiple memory planes; identify one or more additional memory pages included in the multiple memory pages of the TU based on the initial memory page and based on an indication of one or more bad blocks of the memory device, wherein the one or more additional memory pages are included in one or more additional memory planes of the multiple memory planes; and read data from the initial memory page and the one or more additional memory pages included in the TU.

In some implementations, the memory device 120 and/or the controller 130 may be configured to identify a TU associated with a read command, wherein the TU includes multiple memory pages that span multiple memory planes of the memory device; identify an initial memory page of the multiple memory pages of the TU based on a logical-to-physical mapping table, wherein the initial memory page is included in a first memory plane of the multiple memory planes; determine a plane index value of the first memory plane; identify one or more additional memory pages included in the multiple memory pages of the TU based on the initial memory page and based on the plane index value, wherein the one or more additional memory pages are included in one or more additional memory planes of the multiple memory planes; and read data from the initial memory page and the one or more additional memory pages included in the TU.

In some implementations, the memory device 120 and/or the controller 130 may be configured to receive a write command that includes data to be written to multiple memory pages of a TU of the memory device, wherein the multiple memory pages of the TU span multiple memory planes of the memory device; identify the multiple memory pages of the TU, to which the data is to be written, based on: one or more bad blocks of the memory device, and a determination of whether one or more memory pages of the memory device are to be reserved; and write the data to the multiple memory pages of the TU.

In some implementations, the memory device 120 and/or the controller 130 may be configured to store an indication of a set of reserved memory pages of the memory device based on an indication of a set of bad blocks included in the memory device and a TU size, wherein the TU size indicates a quantity of memory pages included in a TU of the memory device, wherein the TU includes multiple memory pages that span multiple memory planes of the memory device; and refrain from writing user data to the set of reserved memory pages.

As indicated above, FIG. 1 is provided as an example. Other examples may differ from what is described with regard to FIG. 1.

Figure 2:
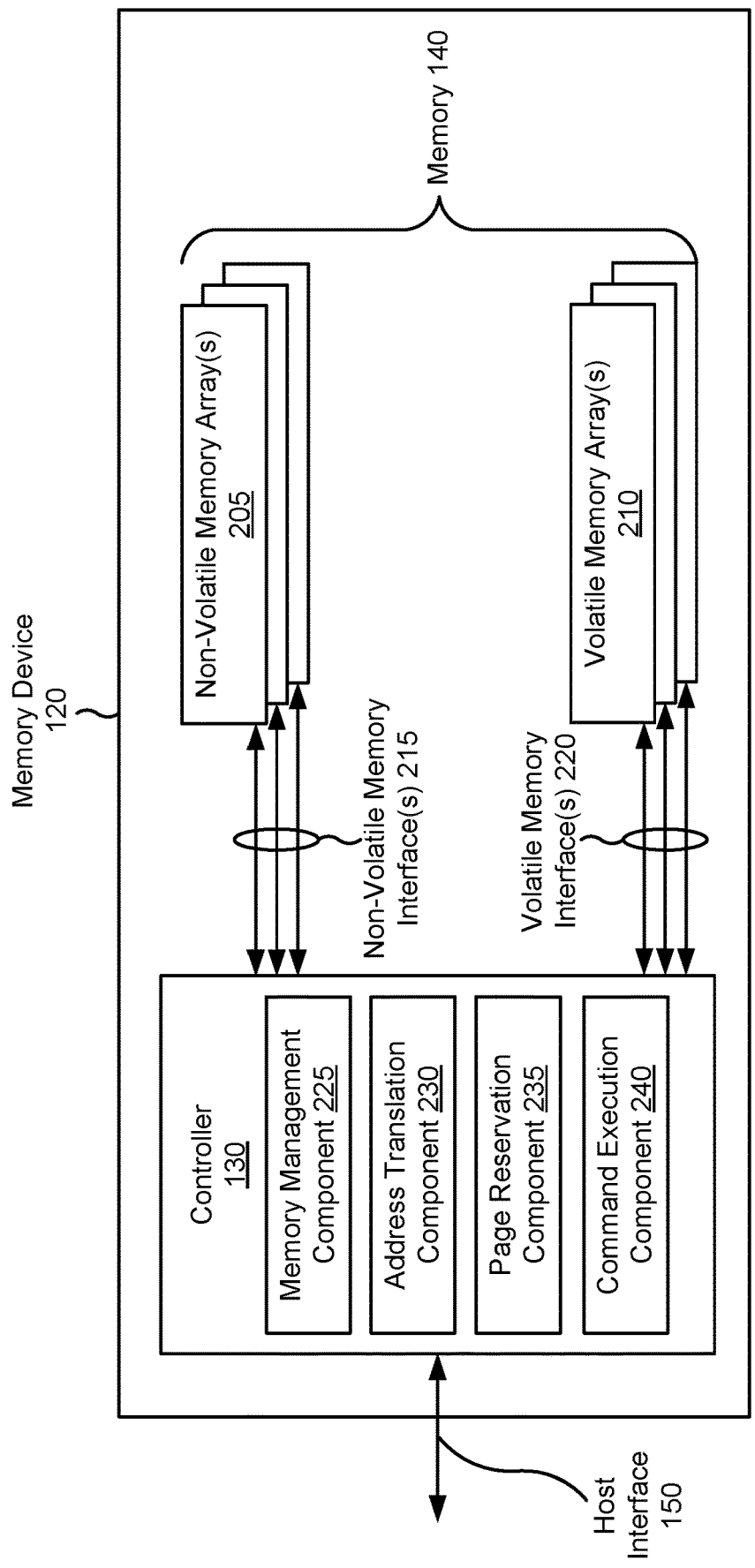
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, an address translation component 230, a page reservation component 235, and/or a command execution component 240. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, one or more bad blocks, and/or error information associated with a memory partition (e.g., a memory cell, a row of memory, a block of memory, or the like).

The address translation component 230 may be configured to perform read address translation and/or write address translation for the memory device 120. For example, the address translation component 230 may perform read address translation for a multi-page TU based on receiving a read command. The address translation component 230 may identify a multi-page TU associated with the read command and may identify multiple memory pages included in the multi-page TU, such as an initial memory page of the multi-page TU and one or more additional memory pages of the multi-page TU. For example, the address translation component 230 may identify the initial memory page of the multi-page TU using a logical-to-physical mapping table, and may identify one or more additional memory pages of the multi-page TU using one or more techniques described herein. In some implementations, the address translation component 230 may refrain from reading data from a reserved memory page.

Additionally, or alternatively, the address translation component 230 may perform write address translation for a multi-page TU based on receiving a write command. The address translation component 230 may identify the multiple memory pages, to be included in the multi-page TU and to which data is to be written, using one or more techniques described herein. For example, the address translation component 230 may identify the multiple memory pages based on one or more bad blocks and/or a determination of whether one or more memory pages are to be reserved. In some implementations, the address translation component 230 may select the memory pages to be included in the multi-page TU using one or more techniques described herein. The address translation component 230 may store an indication of an initial page of the multi-page TU in a logical-to-physical mapping table so that the initial page can be identified during read address translation.

The page reservation component 235 may reserve and unreserve memory pages using one or more techniques described herein. In some implementations, the page reservation component 235 may determine whether to reserve and/or unreserve memory pages (and/or may determine which memory pages are to be reserved and/or unreserved) using one or more techniques described herein. For example, the page reservation component 235 may reserve one or more memory pages based on a bad block configuration. When a memory page is reserved, the memory device 120 is prohibited from storing user data in the memory page. In other words, the memory device 120 may be configured to refrain from storing user data in a reserved memory page. In some implementations, the page reservation component 235 may unreserve one or more memory pages when a bad block configuration changes (e.g., based on detecting a new bad block). When a memory page is unreserved, the memory device 120 is permitted to store user data in the memory page. In other words, the memory device 120 may be configured to store user data in an unreserved memory page. In some implementations, the page reservation component 235 may store an indication of one or more memory pages that are reserved (e.g., based on a bad block configuration and/or a TU size).

The command execution component 240 may be configured to execute one or more memory commands, such as a read command or a write command (sometimes called a program command). For example, the command execution component 240 may execute a read command to read data from a multi-page TU (e.g., from an initial page of the multi-page TU and one or more additional pages of the multi-page TU). The command execution component 240 may read data from the multiple pages (e.g., unreserved pages) of the multi-page TU that are identified during read address translation. As another example, the command execution component 240 may execute a write command to write data to a multi-page TU (e.g., to an initial page of the multi-page TU and one or more additional pages of the multi-page TU). The command execution component 240 may write data to the multiple pages (e.g., unreserved pages) of the multi-page TU that are identified during write address translation. In some implementations, the command execution component 240 may write non-user data (e.g., dummy data or parity data) to a reserved page.

One or more devices or components shown in FIG. 2 may be configured to perform operations described elsewhere herein, such as one or more operations and/or methods described in connection with FIGS. 3-20. For example, the controller 130, the memory management component 225, the address translation component 230, the page reservation component 235, and/or the command execution component 240 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
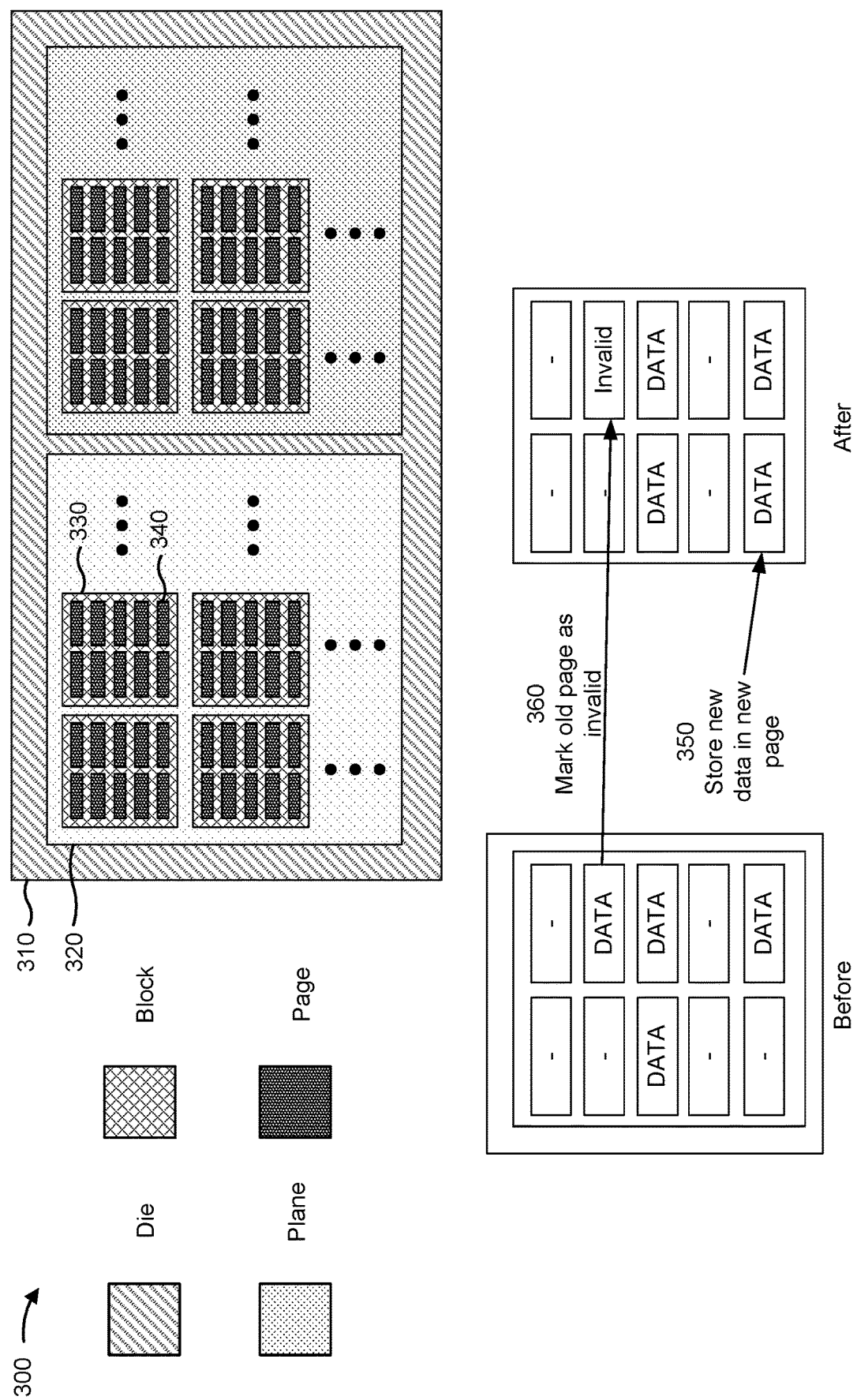
FIG. 3 is a diagram illustrating an example memory architecture that may be used by the memory device.

FIG. 3 is a diagram illustrating an example memory architecture 300 that may be used by the memory device 120. The memory device 120 may use the memory architecture 300 to store data. As shown, the memory architecture 300 may include a die 310, which may include multiple planes 320. A plane 320 may include multiple blocks 330. A block 330 may include multiple pages 340. Although FIG. 3 shows a particular quantity of planes 320 per die 310, a particular quantity of blocks 330 per plane 320, and a particular quantity of pages 340 per block 330, these quantities may be different than what is shown. In some implementations, the memory architecture 300 is a NAND memory architecture.

The die 310 is a structure made of semiconductor material, such as silicon. In some implementations, a die 310 is the smallest unit of memory that can independently execute commands. A memory device 120 may include one or more dies 310. In some implementations, the memory device 120 may include multiple dies 310. In this case, multiples dies 310 may each perform a respective memory operation (e.g., a read operation, a write operation, or an erase operation) in parallel. For example, a controller 130 of the memory device 120 may be configured to concurrently perform memory operations on multiple dies 310 for parallel control.

Each die 310 of a memory device 120 includes one or more planes 320. A plane 320 is sometimes called a memory plane. In some implementations, identical and concurrent operations can be performed on multiple planes 320 (sometimes with restrictions). For example, a multi-plane command (e.g., a multi-plane read command or a multi-plane write command) may be executed on multiple planes 320 concurrently, whereas a single plane command (e.g., a single plane read command or a single plane write command) may be executed on a single plane 320. A logical unit of the memory device 120 may include one or more planes 320 of a die 310. In some implementations, a logical unit may include all planes 320 of a die 310 and may be equivalent to a die 310. Alternatively, a logical unit may include fewer than all planes 320 of a die 310. A logical unit may be identified by a logical unit number (LUN). Depending on the context, the term "LUN" may refer to a logical unit or an identifier (e.g., a number) of that logical unit.

Each plane 320 includes multiple blocks 330. A block 330 is sometimes called a memory block. Each block 330 includes multiple pages 340. A page 340 is sometimes called a memory page. A block 330 is the smallest unit of memory that can be erased. In other words, an individual page 340 of a block 330 cannot be erased without erasing every other page 340 of the block 330. A page 340 is the smallest unit of memory to which data can be written (i.e., the smallest unit of memory that can be programmed with data). The terminology "programming" memory and "writing to" memory may be used interchangeably. A page 340 may include multiple memory cells that are accessible via the same access line (sometimes called a word line). In some implementations, a block 330 may be divided into multiple sub-blocks. A sub-block is a portion of a block 330 and may include a subset of pages 340 of a block and/or a subset of memory cells of a block 330.

In some implementations, read and write operations are performed for a specific page 340, while erase operations are performed for a block 330 (e.g., all pages 340 in the block 330). In some implementations, to prevent wearing out of memory, all pages 340 of a block 330 may be programmed before the block 330 is erased to enable a new program operation to be performed to a page 340 of the block 330. After a page 340 is programmed with data (called "old data" below), that data can be erased, but that data cannot be overwritten with new data prior to being erased. The erase operation would erase all pages 340 in the block 330, and erasing the entire block 330 every time that new data is to replace old data would quickly wear out the memory cells of the block 330. Thus, rather than performing an erase operation, the new data may be stored in a new page (e.g., an empty page), as shown by reference number 350, and the old page that stores the old data may be marked as invalid, as shown by reference number 360. The memory device 120 may then point operations associated with the data to the new page (e.g., in an address table) and may track invalid pages to prevent program operations from being performed on invalid pages prior to an erase operation.

When a block 330 satisfies an erasure condition, the memory device 120 may select the block 330 for erasure, copy the valid data of the block 330 (e.g., to a new block 330 or to the same block 330 after erasure), and erase the block 330. For example, the erasure condition may be that all pages 340 of the block 330 or a threshold quantity or percentage of pages 340 of the block 330 are unavailable for further programming (e.g., are either invalid or already store valid data). As another example, the erasure condition may be that a quantity or percentage of free pages 340 of the block 330 (e.g., pages 340 that are available to be written) is less than or equal to a threshold. The process of selecting a block 330 satisfying an erasure condition, copying valid pages 340 of that block 330 to a new block 330 (or the same block 330 after erasure), and erasing the block 330 is sometimes called garbage collection and is used to free up memory space of the memory device 120.

As indicated above, FIG. 3 is provided as an example. Other examples may differ from what is described with regard to FIG. 3.

FIG. 4 is a diagram illustrating an example 400 of memory address translation. As shown in FIG. 4, the memory device 120 may store one or more address translation tables. An address translation table, sometimes called a logical-to-physical (L2P) mapping table, an L2P address table, or an L2P table, may be used to translate a logical memory address to a physical memory address.

For example, the memory device 120 may receive a memory command (e.g., from a host device 110), and the memory command may indicate a logical memory address, such as a logical block address (LBA), which is sometimes called a host address. The memory device 120 may use one or more address translation tables to identify a physical memory address (sometimes called a physical address) corresponding to the logical memory address. For example, a read command may indicate an LBA from which data is to be read, or a write command may indicate an LBA to which data is to be written (or to overwrite data previously written to that LBA). The memory device 120 may translate that LBA (or multiple LBAs) to a physical address associated with the memory device 120 using an L2P table (or multiple L2P tables). The physical address may indicate a physical location in non-volatile memory, such as a die, a plane, a block, a page, and/or a portion of the page where the data is located.

In some implementations, the memory device 120 may use a logical address called a translation unit (TU), which may correspond to one or more LBAs. As shown in FIG. 4, an entry in an L2P table may indicate a mapping between a TU (e.g., indicated by a TU index value) and a physical address where data associated with that TU is stored. In FIG. 4, the physical address indicates a die, a plane, a block, and a page of the TU.

Some implementations described herein use multi-page TUs, where each TU includes multiple pages (e.g., that span multiple planes of the memory device 120), to reduce a size of the L2P table and thus reduce an amount of DRAM needed to support L2P translation operations. To reduce a size of the L2P table, each L2P entry may map a TU (e.g., a multi-page TU) to an initial page included in that TU, and may not indicate one or more additional pages included in that TU (e.g., to conserve memory resources). As a result, the memory device 120 may need to identify the one or more additional pages in a multi-page TU during read address translation and/or during write address translation. Some implementations described herein enable the memory device 120 to identify the one or more additional pages, in the multi-page TU, that are not explicitly included in an L2P entry. In some cases, identifying the one or more additional pages is complex and may consume additional processing and/or memory resources. Some implementations described herein enable efficient read address translation and/or efficient write address translation that conserves processing and/or memory resources.

As indicated above, FIG. 4 is provided as an example. Other examples may differ from what is described with regard to FIG. 4.

Figure 5:
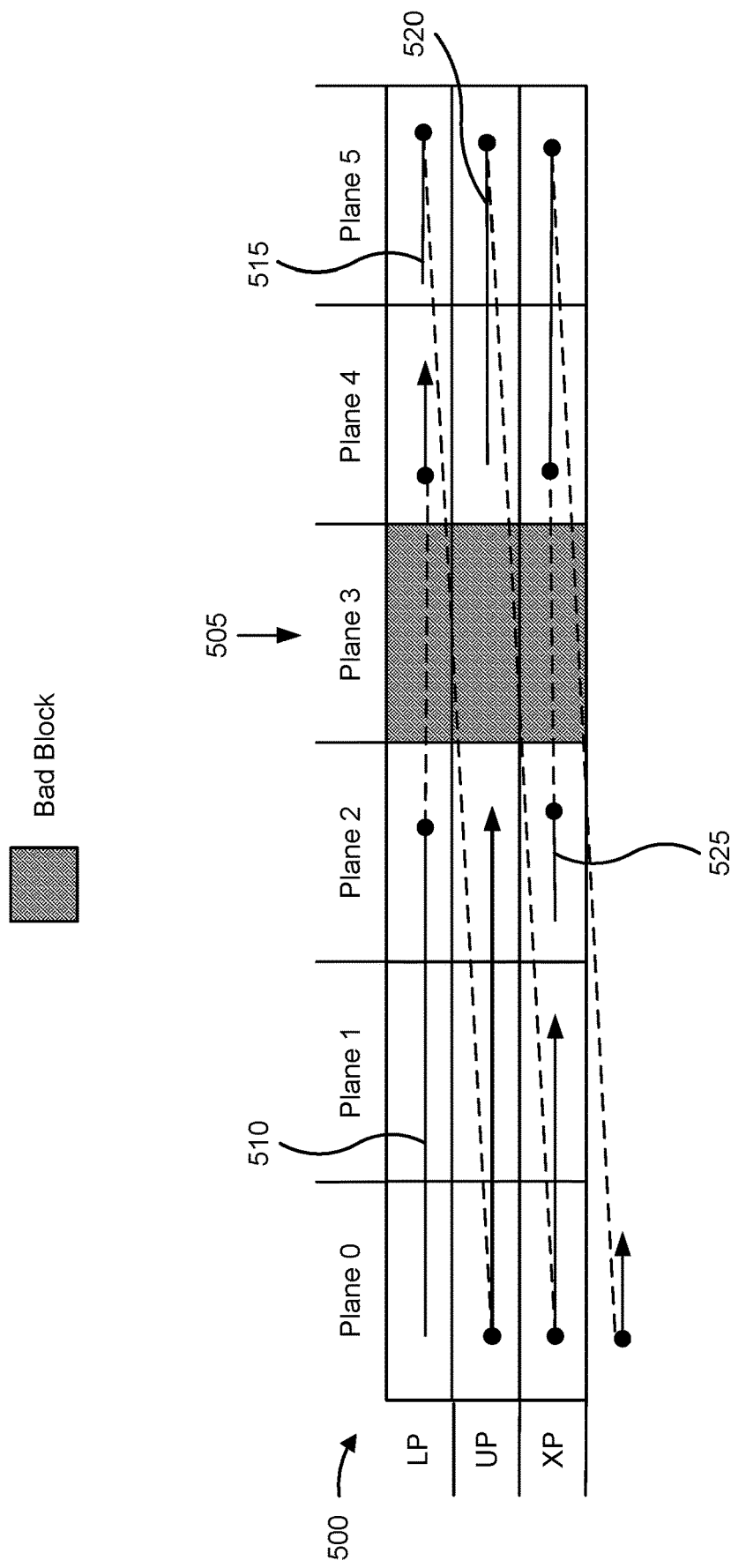
FIG. 5 is a diagram illustrating an example multi-plane page of a memory device.

FIG. 5 is a diagram illustrating an example multi-plane page 500 of a memory device. The example multi-plane page 500 includes triple-level cells (TLCs). In a TLC, a memory cell (e.g., a triple-level memory cell) stores three bits of data. A first bit is stored in a first page associated with the memory cell, shown as a lower page (LP), a second bit is stored in a second page associated with the memory cell, shown as an upper page (UP), and a third bit is stored in a third page associated with the memory cell, shown as an extra page (XP). Each page is associated with multiple memory cells within a plane based on a page size associated with a memory device. For example, a page having a size of 4 kilobytes would include 4,096 memory cells (e.g., where 1 kilobyte equals 1,024 bits) within a plane. In the case of a TLC, the same 4,096 memory cells are used for the lower page, the upper page, and the extra page, where each page of a memory cell can store 1 bit of information. Thus, 4,096 TLC memory cells are capable of storing 12,288 bits (4,096×3=12,288).

Thus, in the example of FIG. 5, the multi-plane page 500 includes each page type of the TLC (e.g., three page types, shown as LP, UP, and XP) across multiple planes of the memory device 120. For example, the multi-plane page 500 includes each page type of the TLC across all planes of the memory device 120, where the memory device 120 includes six planes (shown as Plane 0 through Plane 5). More generally, a multi-plane page may include each page type of a memory cell across multiple planes (e.g., all planes) of the memory device 120. For example, for a single-level cell (SLC) that stores one bit per memory cell, a corresponding multi-plane page would include each page type of the SLC (e.g., a single page type, such as an LP) across multiple planes (e.g., all planes) of the memory device 120. As another example, for a dual-level cell (DLC) or a multi-level cell (MLC) that stores two bits per memory cell, a corresponding multi-plane page would include each page type of the DLC or MLC (e.g., two page types, such as an LP and an UP) across multiple planes (e.g., all planes) of the memory device 120. As another example, for a quad-level cell (QLC) that stores four bits per memory cell, a corresponding multi-plane page would include each page type of the QLC (e.g., four page types, such as an LP, an UP, an XP, and a top page (TP)) across multiple planes (e.g., all planes) of the memory device 120.

As shown in FIG. 5, and by reference number 505, in some cases, a plane may include a bad block (or multiple bad blocks). A bad block is a block that is not used for memory operations (e.g., read or write operations) due to an error or malfunction. For example, a bad block may be a block of memory that is not reliable for storage and/or retrieval of data (e.g., because of physical damage, corruption, defective manufacturing, an error, degradation, component malfunction, or the like). A bad block may be detected as part of a testing process during manufacturing (e.g., where the bad block is due to a manufacturing defect), and/or a bad block may be detected during the lifespan of the memory device (e.g., during operation of the memory device, such as due to degradation over time). In some cases, a plane may include one or more bad blocks and one or more good blocks.

As further shown in FIG. 5, a block of Plane 3 that includes the illustrated multi-plane page 500 is a bad block. Thus, the illustrated lower page, upper page, and extra page cannot be used to store data in Plane 3. As a result, a first multi-page TU that includes four pages (as an example) and that is used to store data in the illustrated multi-plane page 500 may include a lower page in Plane 0, a lower page in Plane 1, a lower page in Plane 2, and a lower page in Plane 4 (e.g., rather than the lower page in Plane 3), as shown by reference number 510. Similarly, as shown by reference number 515, a second multi-page TU that includes four pages and that is used to store data in the illustrated multi-plane page 500 may include a lower page in Plane 5, an upper page in Plane 0, an upper page in Plane 1, and an upper page in Plane 2.

As shown by reference number 520, rather than the initial page of a third multi-page TU being the upper page of Plane 3 (which is included in a bad block), the initial page of the third multi-page TU that includes four pages and that is used to store data in the illustrated multi-plane page 500 may be an upper page in Plane 4, and the multi-page TU may also include an upper page in Plane 5, an extra page in Plane 0, and an extra page in Plane 1.

As shown by reference number 525, to enable use of the remaining three pages of the illustrated multi-plane page 500 (the extra page of Plane 2, the extra page of Plane 4, and the extra page of Plane 5), the memory device 120 must allow multi-plane page crossing, where a multi-page TU is permitted to include pages from multiple multi-plane pages (in the example of FIG. 5, three pages from the illustrated multi-plane page 500 and one page from the next sequential multi-plane page). For example, a fourth multi-page TU that includes four pages may include an extra page in Plane 2, an extra page in Plane 4 (skipping over Plane 3), an extra page in Plane 5, and a lower page in the next sequential multi-plane page that logically follows the illustrated multi-plane page 500.

Permitting a multi-page TU to include pages from different multi-plane pages introduces complexities in read address translation and write address translation when only an initial page of the multi-page TU is indicated in an L2P table. These complexities include determining which additional pages are included in the multi-plane TU (and which multi-plane pages those additional pages belong to) and accounting for bad blocks, among other complexities. However, if a multi-page TU is not permitted to include pages from multiple multi-plane pages, then this would lead to wasted resources. For example, in the example of FIG. 5, three good pages would remain unused (the extra pages of Plane 2, Plane 4, and Plane 5). This may lead to an unacceptable amount of unused resources across the memory device 120. Some implementations described herein enable the memory device 120 to handle the complexities associated with multi-plane page crossing in an efficient manner. Furthermore, some implementations described herein may selectively enable or disable multi-plane page crossing depending on one or more conditions, which enables balancing such complexities and potential wasted memory resources. Additional details are described elsewhere herein.

As indicated above, FIG. 5 is provided as an example. Other examples may differ from what is described with regard to FIG. 5.

Figure 6:
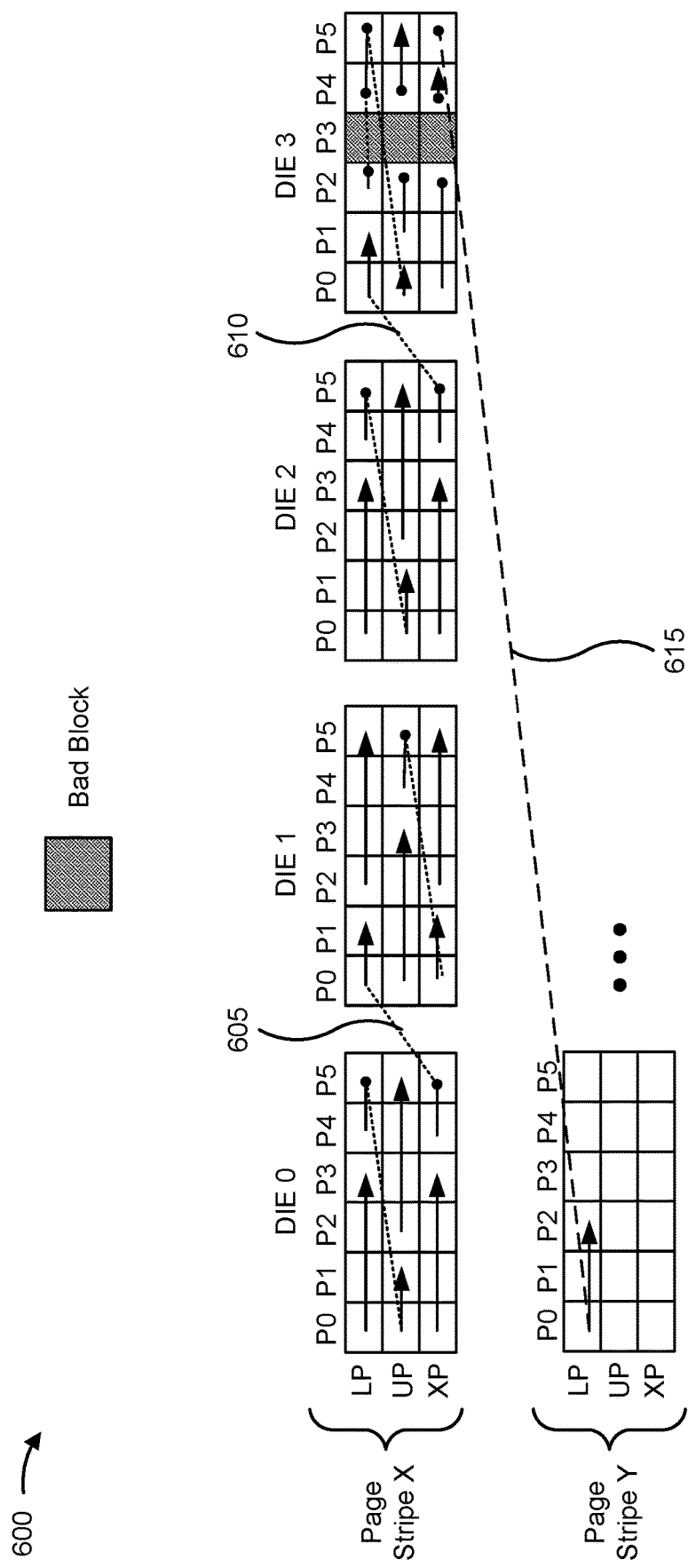
FIG. 6 is a diagram illustrating an example of multi-plane page stripes of a memory device.

FIG. 6 is a diagram illustrating an example 600 of multi-plane page stripes of a memory device. The example multi-plane page stripes shown in FIG. 6 (shown as Page Stripe X and Page Stripe Y) include TLCs. Other example multi-plane page stripes may include SLCs, DLCs (sometimes called MLCs), QLCs, penta-level cells (PLCs), or the like.

As shown in FIG. 6, a multi-plane page stripe includes multi-plane pages across multiple dies, such as all dies of the memory device 120 (e.g., where the memory device 120 includes four dies in the example of FIG. 6). For example, Page Stripe X is shown as including a first multi-plane page of a first die (shown as DIE 0, which includes 6 planes, shown as P0 through P5), a second multi-plane page of a second die (shown as DIE 1), a third multi-plane page of a third die (shown as DIE 2), and a fourth multi-plane page of a fourth die (shown as DIE 3). In some cases, a multi-page TU may cross multi-plane pages included in a multi-plane page stripe, as shown by reference numbers 605 and 610.

In some cases, and as shown by reference number 615, to enable full utilization of pages, the memory device 120 may allow multi-plane page stripe crossing, where a multi-page TU is permitted to include pages from multiple multi-plane page stripes (in the example of FIG. 6, one page from Page Stripe X and three pages from Page Stripe Y). Otherwise, one or more pages at the end of each multi-plane page stripe may be unused, such as the final page of Page Stripe X in FIG. 6. However, this may introduce complexities in read address translation and write address translation when only an initial page of the multi-page TU is indicated in an L2P table. These complexities include determining which additional pages are included in the multi-plane TU (and which multi-plane page stripes those additional pages belong to) and accounting for bad blocks, among other complexities.

Some implementations described herein prohibit a multi-page TU from including pages from different multi-plane page stripes, leading to reduced complexities in read address translation and write address translation (and thus conserving processing and memory resources). For example, the memory device 120 may reserve one or more unused pages at the end of a multi-plane page stripe to prevent user data from being stored in those pages, rather than permitting data to be stored in those pages with multi-plane page stripe crossing, to reduce complexity. If a bad block configuration of the memory device 120 changes at a later time (e.g., due to degradation during a lifespan of the memory device), then the memory device 120 may unreserve one or more reserved pages to enable user data to be stored in those pages without multi-plane page stripe crossing, thereby improving memory resource utilization. Additional details are described elsewhere herein.

As indicated above, FIG. 6 is provided as an example. Other examples may differ from what is described with regard to FIG. 6.

Figure 7:
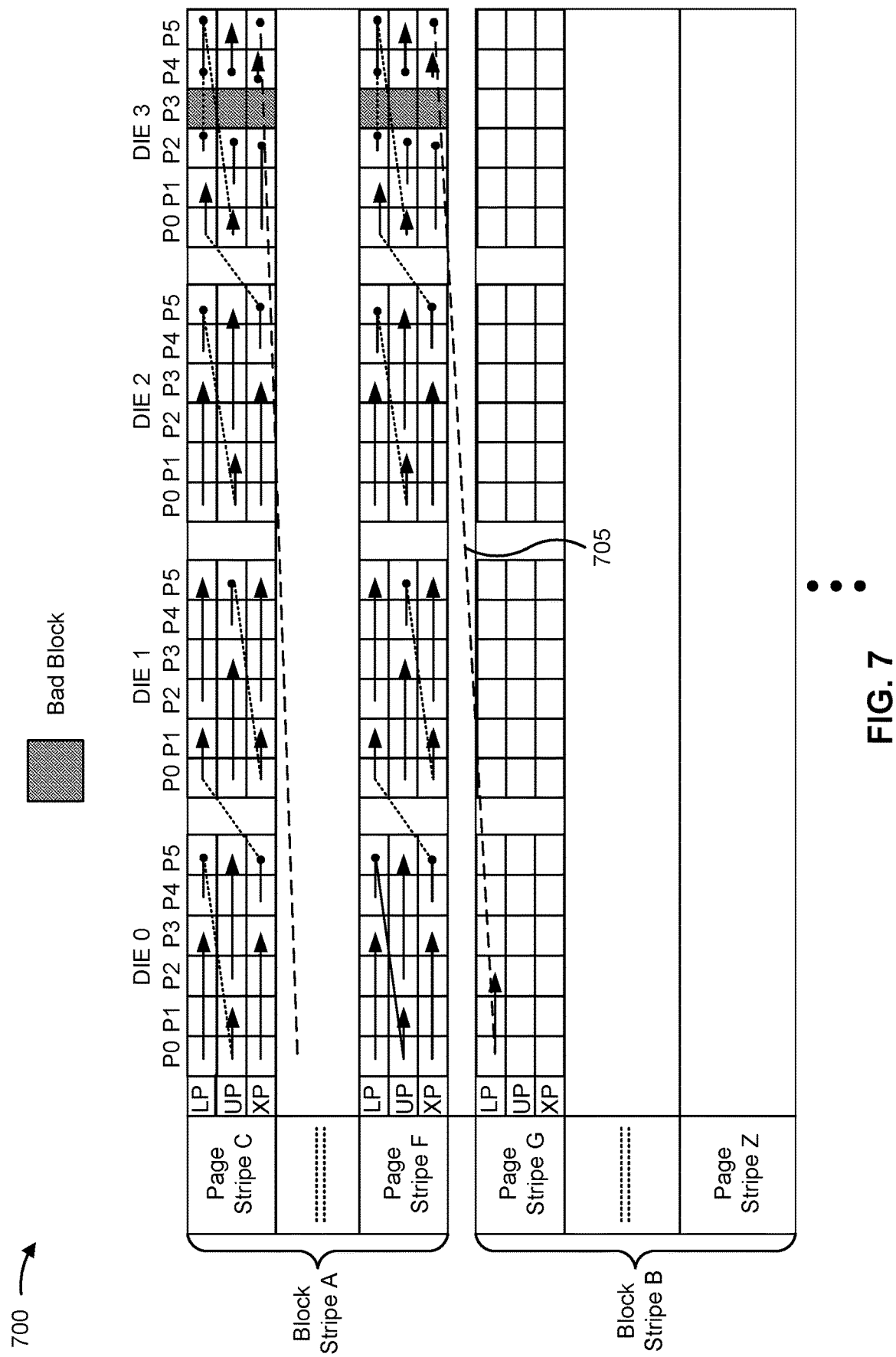
FIG. 7 is a diagram illustrating an example of multi-plane block stripes of a memory device.

FIG. 7 is a diagram illustrating an example 700 of multi-plane block stripes of a memory device. The example multi-plane block stripes shown in FIG. 7 (shown as Block Stripe A and Block Stripe B) include TLCs. Other example multi-plane block stripes may include SLCs, DLCs (sometimes called MLCs), QLCs, PLCs, or the like. Furthermore, in some implementations, a multi-plane block stripe may include multi-plane page stripes having different types of memory cells, such as a first page stripe having SLCs, a second page stripe having TLCs, and so on.

As shown in FIG. 7, a multi-plane block stripe includes multiple multi-plane page stripes. For example, Block Stripe A is shown as including Page Stripe C through Page Stripe F, and Block Stripe B is shown as including Page Stripe G through Page Stripe Z.

In some cases, and as shown by reference number 705, to enable full utilization of pages, the memory device 120 may allow multi-plane block stripe crossing, where a multi-page TU is permitted to include pages from multiple multi-plane block stripes (in the example of FIG. 7, one page from Block Stripe A and three pages from Block Stripe B). Otherwise, one or more pages at the end of each multi-plane block stripe may be unused, such as the final page of Block Stripe A in FIG. 7. However, this may introduce complexities in read address translation and write address translation when only an initial page of the multi-page TU is indicated in an L2P table. These complexities include determining which additional pages are included in the multi-plane TU (and which multi-plane block stripes those additional pages belong to) and accounting for bad blocks, among other complexities.

Some implementations described herein prohibit a multi-page TU from including pages from different multi-plane block stripes, leading to reduced complexities in read address translation and write address translation (and thus conserving processing and memory resources). For example, the memory device 120 may reserve one or more unused pages at the end of a multi-plane block stripe to prevent user data from being stored in those pages, rather than permitting data to be stored in those pages with multi-plane block stripe crossing, to reduce complexity. If a bad block configuration of the memory device 120 changes at a later time (e.g., due to degradation during a lifespan of the memory device), then the memory device 120 may unreserve one or more reserved pages to enable user data to be stored in those pages without multi-plane block stripe crossing, thereby improving memory resource utilization. Additional details are described elsewhere herein.

As indicated above, FIG. 7 is provided as an example. Other examples may differ from what is described with regard to FIG. 7.

Figure 8:
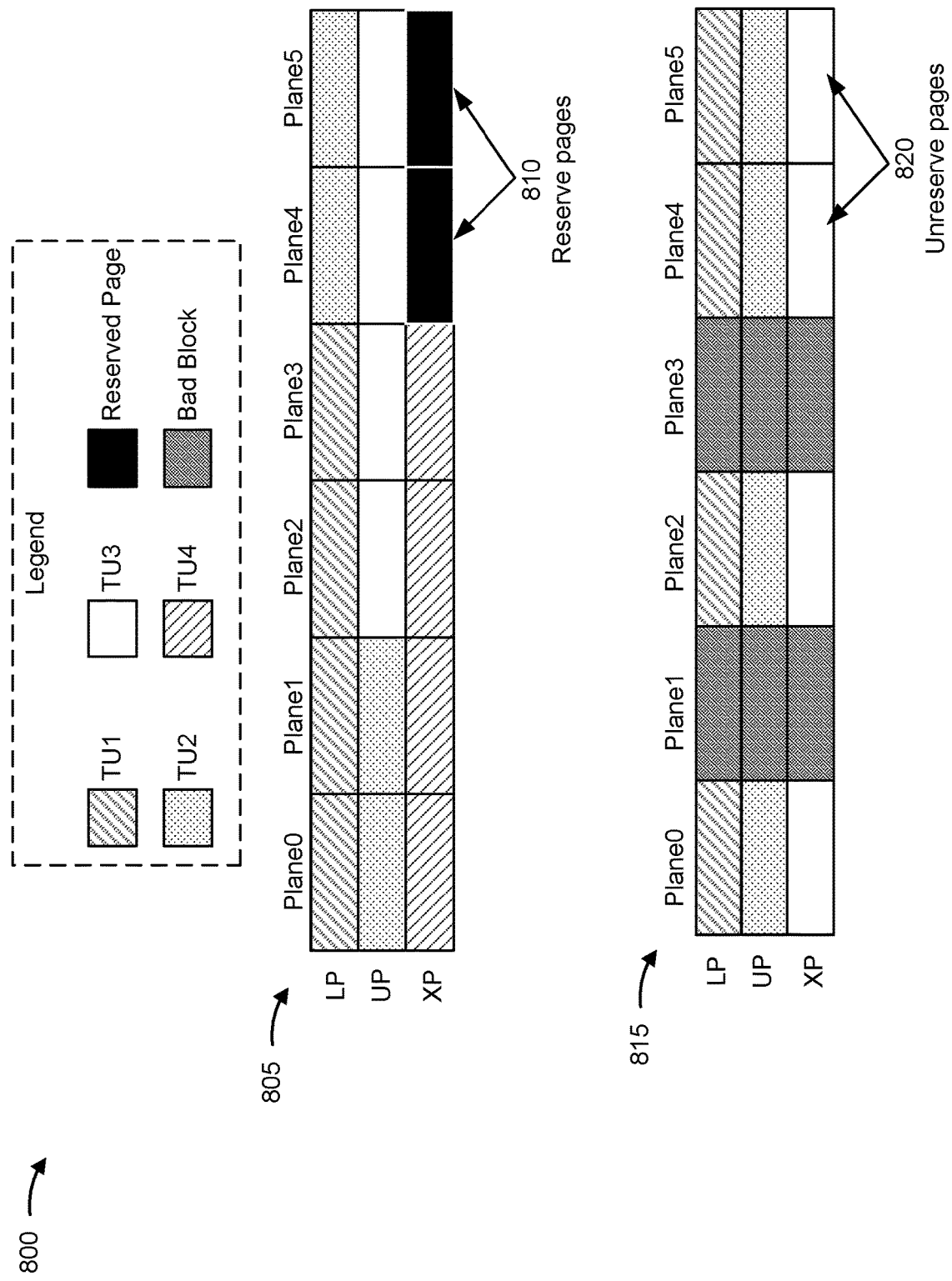
FIG. 8 is a diagram of an example of reserving and unreserving memory pages for multi-page translation units.

FIG. 8 is a diagram of an example 800 of reserving and unreserving memory pages for multi-page translation units. The operations described in connection with FIG. 8 may be performed by the memory device 120 and/or one or more components of the memory device 120, such as the controller 130 and/or one or more components of the controller 130. In example 800, a multi-plane page includes TLCs across six planes (Plane 0 through Plane 5), and a multi-page TU includes four pages. As described elsewhere herein, a multi-page TU may include multiple memory pages that span multiple memory planes of the memory device 120.

As shown by reference number 805, at a first time, a multi-plane page does not include any bad blocks. In this case, and as shown, the memory device 120 may write data to a first multi-page TU, shown as TU1, in the lower page of Plane 0 through Plane 3. The memory device 120 may store, in the L2P table, an indication of the initial page of the first multi-page TU, such as by storing an indication that a logical address of TU1 corresponds to a physical address corresponding to the lower page of Plane 0 of the illustrated multi-plane page (e.g., along with an indication of a die and/or a block that includes the multi-plane page). To conserve memory resources, the memory device 120 may refrain from storing an indication of the second, third, and fourth pages of the first multi-page TU in the L2P table (e.g., the lower pages of Plane 1 through Plane 3).

As further shown, the memory device 120 may write data to a second multi-page TU, shown as TU2, in the lower page of Plane 4 and Plane 5, and in the upper page of Plane 0 and Plane 1. The memory device 120 may store, in the L2P table, an indication of the initial page of the second multi-page TU, such as by storing an indication that a logical address of TU2 corresponds to a physical address corresponding to the lower page of Plane 4 of the illustrated multi-plane page (e.g., along with an indication of a die and/or a block that includes the multi-plane page). To conserve memory resources, the memory device 120 may refrain from storing an indication of the second, third, and fourth pages of the second multi-page TU in the L2P table (e.g., the lower page of Plane 5 and the upper pages of Plane 0 and Plane 1).

As further shown, the memory device 120 may write data to a third multi-page TU, shown as TU3, in the upper page of Plane 2 through Plane 5. The memory device 120 may store, in the L2P table, an indication of the initial page of the third multi-page TU, and the memory device 120 may refrain from storing an indication of the second, third, and fourth pages of the third multi-page TU in the L2P table, in a similar manner as described above.

As further shown, the memory device 120 may write data to a fourth multi-page TU, shown as TU4, in the extra page of Plane 0 through Plane 3. The memory device 120 may store, in the L2P table, an indication of the initial page of the fourth multi-page TU, and the memory device 120 may refrain from storing an indication of the second, third, and fourth pages of the fourth multi-page TU in the L2P table, in a similar manner as described above.

Based on writing data for the first multi-page TU through the fourth multi-page TU to the illustrated multi-plane page, the memory device 120 may (under some conditions, described in more detail elsewhere herein) reserve one or more pages. For example, because the memory device 120 cannot write a full multi-page TU (e.g., that includes all four pages of the multi-page TU) to the multi-plane page, the memory device 120 may reserve the final two pages of the multi-plane page, as shown by reference number 810. Additionally, or alternatively, the memory device 120 may reserve one or more pages to improve read address translation, as described in more detail elsewhere herein.

When a page is reserved, the memory device 120 is prohibited from storing or writing user data to the page. In other words, the memory device 120 may be configured to refrain from storing or writing user data to a reserved page. This may reduce complexity associated with read address translation, where the memory device 120 does not need to identify pages, of a multi-page TU, across multiple multi-plane pages, across multiple multi-plane page stripes, and/or across multiple multi-plane block stripes. In some implementations, the memory device 120 may write non-user data to a reserved memory page, such as dummy data (e.g., all 0s or all 1s) or parity data. For example, the memory device 120 may write parity data associated with one or more TUs included in the same multi-plane page as the reserved page. In this way, useful information may be stored in reserved pages (e.g., rather than dummy data), which improves memory utilization and/or reliability.

In some implementations, a quantity of pages reserved by the memory device 120 in a multi-plane page may depend on a cell type (e.g., SLC, DLC, TLC, QLC, and so on) of the multi-plane page, a TU size of the multi-page TU (e.g., a quantity of memory pages included in a multi-page TU), and/or a bad block configuration associated with the multi-plane page (e.g., a quantity and/or location of bad blocks in the multi-plane page). As an example, for the TLC multi-plane page shown in FIG. 8, there are 18 total pages (6 LPs, 6 UPs, and 6 XPs). For a TU size of four (e.g., four pages per multi-page TU) and no bad blocks, the memory device 120 reserves two pages (18 modulo 4=2). As another example, for a TU size of three pages and no bad blocks or for a TU size of two and no bad blocks, the memory device 120 would not reserve any pages (18 modulo 3=0 and 18 modulo 2=0). As another example, for a TU size of five pages and no bad blocks, the memory device 120 would reserve three pages (18 modulo 5=3).

As shown by reference number 815, at a later time, a bad block configuration of the multi-plane page changes, and the multi-plane page includes bad blocks. A bad block configuration may change, for example, when a new bad block is detected during the lifespan and/or operation of the memory device 120, such as due to degradation, malfunction, damage, or error. As shown, a block of Plane 1 and a block of Plane 3 that each include the illustrated multi-plane page are each identified as bad blocks. Thus, the illustrated lower page, upper page, and extra page cannot be used to store data in Plane 1 or in Plane 3. Based on detecting a new bad block configuration (e.g., a new bad block), the memory device 120 may mark one or more reserved memory pages (e.g., all or a subset of the reserved memory pages) as unreserved memory pages. This may enable the memory device 120 to write user data to an unreserved memory page that was previously marked as a reserved memory page.

For example, as shown in connection with reference number 815, the memory device 120 (e.g., after erasing the multi-plane page and/or identifying the bad blocks) may write data to a first multi-page TU (e.g., TU1), in the lower page of Plane 0, Plane 2, Plane 4, and Plane 5. Similarly, the memory device 120 may write data to a second multi-page TU (e.g., TU2), in the upper page of Plane 0, Plane 2, Plane 4, and Plane 5. Finally, the memory device 120 may write data to a third multi-page TU (e.g., TU3), in the extra page of Plane 0, Plane 2, Plane 4, and Plane 5. In this case, and as shown by reference number 820, the memory device 120 unreserves the previously reserved pages so that user data (e.g., of the multi-page TU) can be written to those pages. When a page is unreserved, the memory device 120 is permitted to store or write user data to the page. In other words, the memory device 120 may be configured to store or write user data to an unreserved memory page. This may improve memory resource utilization of the memory device 120.

As indicated above, FIG. 8 is provided as an example. Other examples may differ from what is described with regard to FIG. 8.

Figure 9:
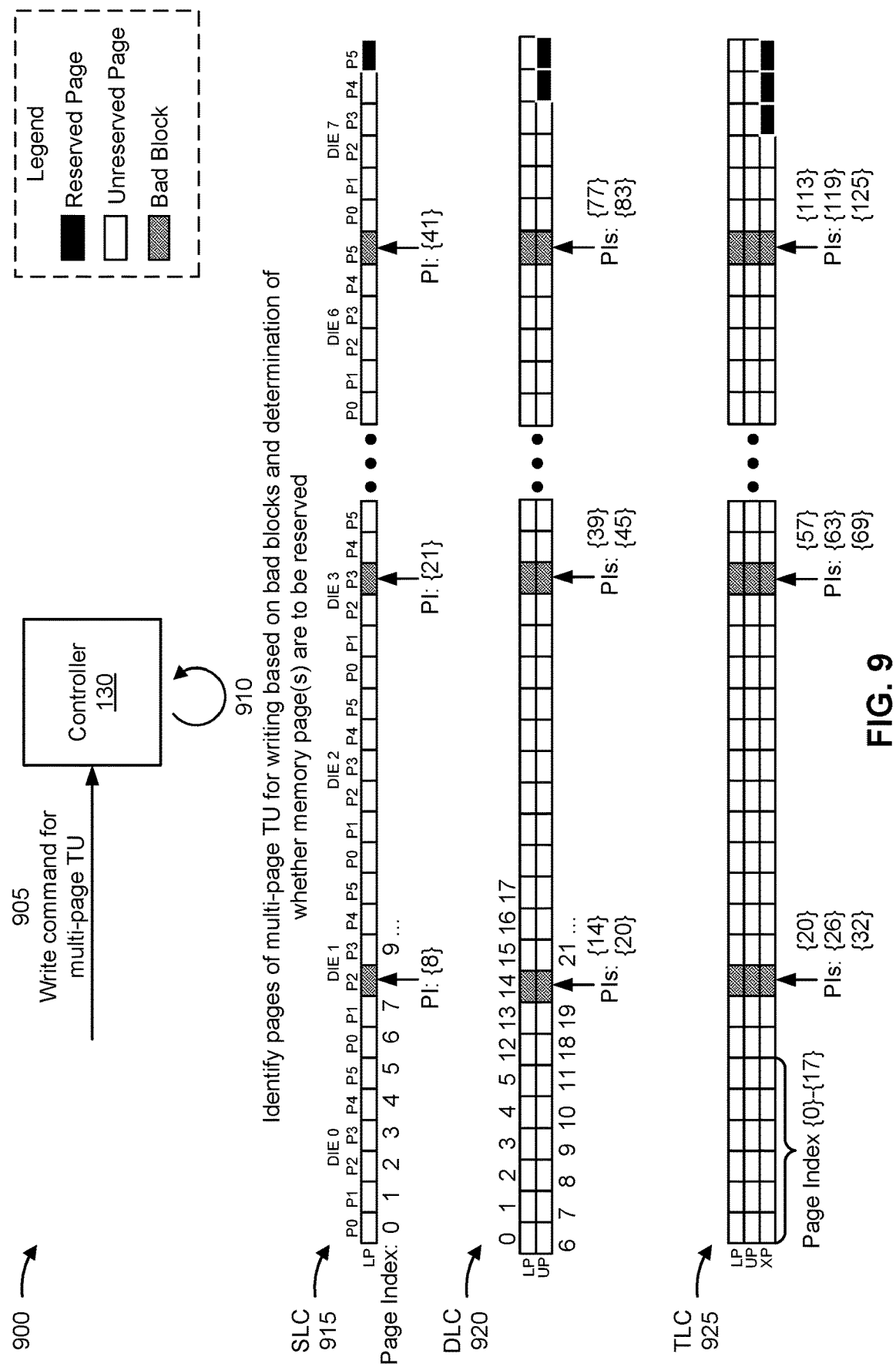
FIG. 9 is a diagram of an example of write address translation using reserved memory pages for multi-page translation units.

FIG. 9 is a diagram of an example 900 of write address translation using reserved memory pages for multi-page translation units. The operations described in connection with FIG. 9 may be performed by the memory device 120 and/or one or more components of the memory device 120, such as the controller 130 and/or one or more components of the controller 130.

As shown by reference number 905, the memory device 120 (e.g., the controller 130) may receive a write command for a multi-page TU. For example, the memory device 120 may receive a write command that includes data to be written to multiple memory pages of a TU of the memory device 120. As described elsewhere herein, the multiple memory pages of the TU (e.g., the multi-page TU) may span multiple memory planes of the memory device 120. In some implementations, the memory device 120 may receive the write command from the host device 110. The write command may include, for example, one or more LBAs. The one or more LBAs may correspond to one or more TUs. For example, a TU may correspond to a single LBA or may correspond to multiple LBAs.

As shown by reference number 910, the memory device 120 (e.g., the controller 130) may identify the multiple memory pages of the TU, to which the data is to be written, based on one or more bad blocks of the memory device 120 and/or a determination of whether one or more memory pages of the memory device 120 are to be reserved. In some implementations, a write cursor may indicate a next page of the memory device 120 that is to be written (e.g., using a page index, a multi-plane page stripe index, a block index, a plane index, and/or a die index). The write cursor may skip over bad pages. A bad page is a page included in a bad block. In the example of FIG. 9, the illustrated pages included in Plane 2 (shown as P2) of Die 1 are bad pages, the illustrated pages included in Plane 3 (shown as P3) of Die 3 are bad pages, and the illustrated pages included in Plane 5 (shown as P5) of Die 6 are bad pages.

When writing data to a multi-page TU, the memory device 120 writes to an initial page of the multi-page TU (e.g., as indicated by the write cursor) and then writes to one or more additional pages that follow the initial page sequentially, except the memory device 120 skips over (e.g., does not write data to) any bad pages. The number of pages written by the memory device 120 depends on the TU size of the multi-page TU. For example, for a TU size of four, the memory device 120 writes to four pages (an initial page and three additional pages).

The memory device 120 may write to pages sequentially using a page write sequence. The page write sequence may include writing to all pages of a particular page type (e.g., one of LP, UP, XP, TP, and so on) across all planes within a die (e.g., in order from lowest-indexed plane to highest-indexed plane), then writing to the next page type across all planes within that die (e.g., following the page type order of LP, UP, XP, TP, and so on), and so on. To continue the page write sequence, after writing to all of the page types within a particular die, the memory device 120 writes to the next die in the same manner (e.g., writing to all planes and a particular page type before moving to the next page type).

In some implementations, each page within a multi-plane page stripe is identified using a page index value. The memory device 120 may write to pages in a multi-plane page stripe sequentially based on page index values, starting with a lowest page index value and ending with a highest page index value. Each page within a multi-plane page stripe may be identified using a different page index value. Example page index values are shown in FIG. 9.

For example, for a multi-plane page stripe 915 with SLCs, the memory device 120 would follow the page write sequence by writing to the lower page (LP) of Plane 0 of Die 0 (shown as having a page index value of 0), then the lower page of Plane 1 of Die 0 (shown as having a page index value of 1), and so on to write to all lower pages of Die 0 (e.g., from Plane 0 to Plane 5, shown as having page index values of 0 through 5). The memory device 120 would then write to each lower page of each plane of Die 1 sequentially across planes of Die 1 (having page index values of 6 through 11), except for the lower page of Plane 2 of Die 1 (shown as having a page index value of 8), which is a bad page. The memory device 120 would then write to each lower page of each plane of Die 2 sequentially across planes, then each lower page of each plane of Die 3 sequentially across planes (except for the lower page of Plane 3, shown as having a page index value of 21), and so on for Die 4 and Die 5 (not shown, but which do not include any bad pages), Die 6 (except for the lower page of Plane 5, shown as having a page index value of 41), and Die 7.

In some implementations, the memory device 120 is configured to prohibit multi-plane page stripe crossing and/or multi-plane block stripe crossing to reduce complexity. In other words, the memory device 120 may prevent a multi-page TU from including pages from multiple multi-plane page stripes and/or may prevent a multi-page TU from including pages from multiple multi-plane block stripes. In some implementations, to prevent multi-plane page stripe crossing, the memory device 120 may reserve one or more pages at the end of a multi-plane page stripe to prevent user data from being stored in those pages. The "end" of the multi-plane page stripe refers to the last page(s) to be written in that multi-plane page stripe. In some implementations, to prevent multi-plane block stripe crossing, the memory device 120 may reserve one or more pages at the end of a multi-plane block stripe to prevent user data from being stored in those pages. The "end" of the multi-plane block stripe refers to the last page(s) to be written in that multi-plane block stripe. Thus, in some implementations, all memory pages included in a multi-page TU are included in a single multi-plane page stripe and a single multi-plane block stripe. Although different multi-page TUs can be included in different multi-plane page stripe and/or different multi-plane block stripes, each individual multi-page TU must be included in a particular multi-plane page stripe and a particular multi-plane block stripe.

In some implementations, a quantity of pages reserved by the memory device 120 at the end of the multi-plane page stripe may depend on a cell type (e.g., SLC, DLC, TLC, QLC, and so on) of memory cells included in the multi-plane page stripe, a TU size of the multi-page TU, and/or a bad block configuration associated with the multi-plane page stripe (e.g., a quantity and/or location of bad blocks in the multi-plane page stripe). Because the memory device 120 may reserve pages that are not capable of forming a full multi-page TU, the quantity of page reserved by the memory device 120 at the end of the multi-plane page stripe may be less than a quantity of pages included in the multi-page TU.

As an example, for the SLC multi-plane page stripe 915 shown in FIG. 9, there are 48 total pages (1 LP in each of 6 planes in each of 8 dies). However, 3 of those pages are included in bad blocks, leaving a total of 45 good pages. For a TU size of four, the memory device 120 reserves one page at the end of the SLC multi-plane page stripe 915 because the memory device 120 can construct 11 full TUs to fill a total of 44 pages, leaving one page left (45 modulo 4=1). Thus, if the memory device 120 is configured to prohibit multi-plane page stripe crossing, then the memory device 120 reserves one page at the end of the SLC multi-plane page stripe 915 (having a page index value of 47).

As another example, for a multi-plane page stripe 920 with DLCs (or MLCs), the memory device 120 would follow the page write sequence by writing to all of the lower pages across all planes in Die 0 (shown as having page index values of 0 through 5) and then all of the upper pages across all planes in Die 0 (shown as having page index values of 6 through 11), repeating that sequence for Die 1 (skipping over bad pages in Plane 2 of Die 1, shown as having page index values of 14 and 20), then Die 2, then Die 3 (skipping over bad pages in Plane 3 of Die 3, shown as having page index values of 39 and 45), then Die 4, then Die 5, then Die 6 (skipping over bad pages in Plane 5 of Die 6, shown as having page index values of 77 and 83), then Die 7. Unlike the SLC multi-plane page stripe 915 described above, the memory device 120 would write to the LP included in Plane 5 of Die 7 for the DLC multi-plane page stripe 920. The memory device 120 would not reserve this page in the DLC multi-plane page stripe 920 because the memory device 120 would continue writing to the upper pages of Die 7, such that the lower page of Plane 5 of Die 7 and the upper pages of Planes 0, 1, and 2 of Die 7 would form a TU with four pages. However, the memory device 120 would reserve the last two pages of the DLC multi-plane page stripe 920 (e.g., the upper page in Plane 4 of Die 7 and the upper page in Plane 5 of Die 7, having page index values of 94 and 95).

For the DLC multi-plane page stripe 920 shown in FIG. 9, there are 96 total pages (48 LPs and 48 UPs). However, 6 of those pages are included in bad blocks, leaving a total of 90 good pages. For a TU size of four, the memory device 120 reserves two pages at the end of the DLC multi-plane page stripe 920 because the memory device 120 can construct 22 full TUs to fill a total of 88 pages, leaving two page left (90 modulo 4=2). Thus, if the memory device 120 is configured to prohibit multi-plane page stripe crossing, then the memory device 120 reserves two pages at the end of the DLC multi-plane page stripe 920.

As another example, for a multi-plane page stripe 925 with TLCs, the memory device 120 would follow the page write sequence by writing to all of the lower pages across all planes in Die 0 (having page index values of 0 through 5), then all of the upper pages across all planes in Die 0 (having page index values of 6 through 11), and then all of the extra pages across all planes in Die 0 (having page index values of 12 through 17). The memory device 120 would then follow that sequence for Die 1 (skipping over bad pages in Plane 2 of Die 1, shown as having page index values of 20, 26, and 32), then Die 2, then Die 3 (skipping over bad pages in Plane 3 of Die 3, shown as having page index values of 57, 63, and 69), then Die 4, then Die 5, then Die 6 (skipping over bad pages in Plane 5 of Die 6, shown as having page index values of 113, 119, and 125), then Die 7.

For the TLC multi-plane page stripe 925 shown in FIG. 9, there are 144 total pages (48 LPs, 48 UPs, and 48 XPs). However, 9 of those pages are included in bad blocks, leaving a total of 135 good pages. For a TU size of four, the memory device 120 reserves three pages at the end of the TLC multi-plane page stripe 925 because the memory device 120 can construct 33 full TUs to fill a total of 132 pages, leaving three page left (135 modulo 4=3). Thus, if the memory device 120 is configured to prohibit multi-plane page stripe crossing, then the memory device 120 reserves three pages at the end of the TLC multi-plane page stripe 925 (e.g., the extra page in Plane 3 of Die 7, the extra page in Plane 4 of Die 7 and the extra page in Plane 5 of Die 7, having page index values of 141, 142, and 143).

Thus, when writing data of a multi-page TU, the memory device 120 may identify the pages included in the multi-page TU based on one or more bad blocks and/or a determination of whether one or more pages are to be reserved (and which memory pages are to be reserved). For example, the memory device 120 may skip bad pages (e.g., may refrain from writing to those pages and/or may exclude those pages from the multi-page TU) and may skip reserved pages (e.g., by identifying reserved pages, such as one or more pages at the end of a multi-plane page stripe that cannot form a full multi-page TU).

After identifying the pages of the multi-page TU (and excluding bad pages and reserved pages from the multi-page TU), the memory device 120 may write data, included in the write command, to the identified pages. In some implementations, the memory device 120 may store, in an L2P table, an indication of the initial page of the multi-page TU, such as the first sequential page in the multi-page TU (e.g., along with an indication of a die and/or a block that includes the multi-plane page). To conserve memory resources, the memory device 120 may refrain from storing an indication of any additional pages of the multi-page TU in the L2P table.

In some implementations, the memory device 120 may store (e.g., in memory 140) a data structure that indicates one or more bad blocks (e.g., a set of bad blocks), sometimes called a bad block data structure. The bad block data structure may indicate one or more bad blocks (e.g., using block identifiers) and/or one or more bad pages (e.g., using page identifiers, such as page index values). The memory device 120 may use the bad block data structure (e.g., a bad block table) to determine whether any memory pages are to be reserved and/or to identify memory pages to be reserved. In some implementations, the memory device 120 may also store (e.g., in memory 140) a reservation configuration that indicates one or more memory pages to be reserved (e.g., a set of reserved memory pages), which may be based on the one or more bad blocks, a TU size, and/or a cell type (as described above). The memory device 120 may use the bad block table and/or the reservation configuration when identifying pages to be included in a multi-page TU (e.g., to identify bad pages or reserved pages to be skipped).

If the memory device 120 detects a new bad block (e.g., based on detecting an error or another condition associated with a block), then the memory device 120 may store an indication of the new bad block in the bad block data structure. The memory device 120 may then modify the reservation configuration based on the updated bad block table (and/or the TU size and/or cell type). In some cases, detecting a new bad block may result in a greater quantity of reserved pages than before the bad block was detected. In other cases, detecting a new bad block may result in a lesser quantity of reserved pages than before the bad block was detected. In either case, the memory device 120 may update the reservation configuration to indicate the reserved pages.

As indicated above, FIG. 9 is provided as an example. Other examples may differ from what is described with regard to FIG. 9.

Figure 10:
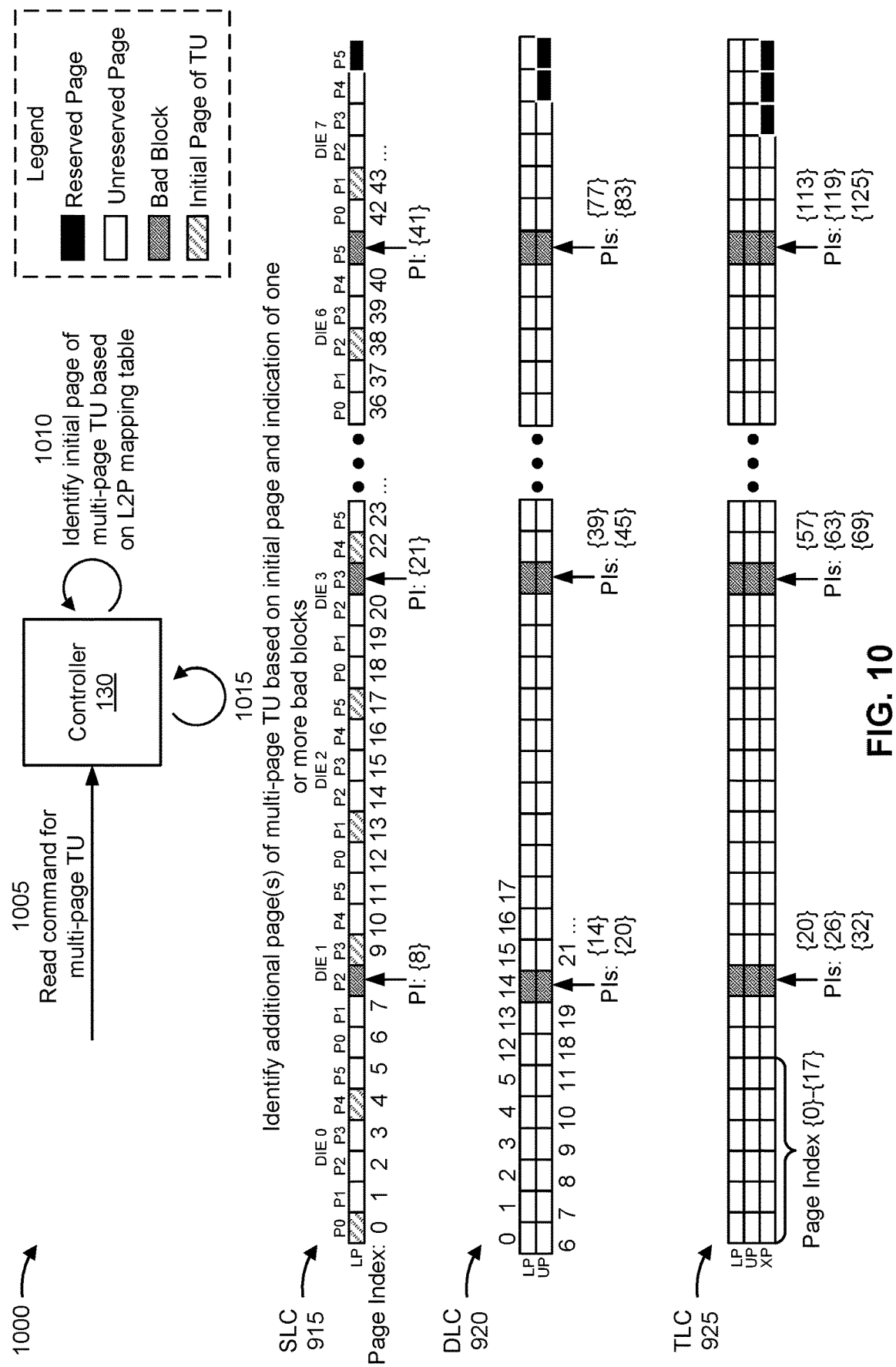
FIG. 10 is a diagram of an example of read address translation using reserved memory pages for multi-page translation units.

FIG. 10 is a diagram of an example 1000 of read address translation using reserved memory pages for multi-page translation units. The operations described in connection with FIG. 10 may be performed by the memory device 120 and/or one or more components of the memory device 120, such as the controller 130 and/or one or more components of the controller 130.

As shown by reference number 1005, the memory device 120 (e.g., the controller 130) may receive a read command for a multi-page TU. In some implementations, the memory device 120 may receive the read command from the host device 110. The read command may include, for example, one or more LBAs. The one or more LBAs may correspond to one or more TUs. For example, a TU may correspond to a single LBA or may correspond to multiple LBAs.

As shown by reference number 1010, the memory device 120 may identify an initial page of the multi-page TU based on an L2P mapping table. In some implementations, an entry of the L2P mapping table (sometimes called an L2P entry or an L2P table entry) may indicate a TU (e.g., using a TU index value), such as a multi-page TU, and may indicate an initial page associated with that TU (e.g., using a page identifier, such as a page index value). To conserve memory resources, the L2P entry may indicate only a single page associated with the multi-page TU, rather than the indicating multiple pages or all of the pages associated with the multi-page TU. In some implementations, the single page is an initial page, such as a first sequential page of the multi-page TU (e.g., following a page write sequence, such as the sequence described above in connection with FIG. 9).

In some implementations, a page identifier included in the L2P entry may uniquely identify a page of the memory device 120 (e.g., across the entire memory device 120, including all dies, blocks, planes, and/or other memory units). Alternatively, a page identifier (e.g., a page index value) may identify a page within a unit of memory, such as within a multi-plane page stripe. For example, a page may be identified using a die identifier to identify a die that includes the page, a plane identifier to identify a plane that includes the page, a block identifier to identify a block that includes the page, a multi-plane page stripe identifier to identify a multi-plane page stripe, and/or a page identifier to identify the page (e.g., within the die, plane, block, and/or multi-plane page stripe). The memory device 120 may identify the initial page of a TU by performing a lookup of the TU (e.g., using a TU index value, which may be determined based on an LBA and/or other information indicated in the read command) to identify an L2P entry associated with the TU and then identifying a page (e.g., via a page index value) indicated in that L2P entry.

As shown by reference number 1015, the memory device 120 may identify one or more additional pages of the multi-page TU based on the initial page and an indication of one or more bad blocks of the memory device 120 (which may indicate one or more reserved memory pages of the memory device 120). For example, a multi-page TU may include an initial page and one or more additional pages. In some implementations, the initial page is indicated in the L2P table (as described above) and the one or more additional pages are not indicated in the L2P table. For example, if the multi-page TU includes four pages, one of those four pages (e.g., the initial page) may be indicated in the L2P table, and the remaining three of those four pages (e.g., the additional pages) may not be indicated in the L2P table. Thus, the memory device 120 may need to determine the one or more additional pages based on the initial page and one or more techniques described herein.

As described elsewhere herein, the multiple pages of the TU (e.g., the multi-page TU) may span multiple planes of the memory device 120. For example, the initial page of the multi-page TU may be included in a first plane (sometimes called an initial plane) of the multiple planes, and the one or more additional pages may be included in one or more additional planes of the multiple planes. In some cases (e.g., depending on a quantity of planes in the memory device 120, a bad block configuration, and/or a reservation configuration), each page of the multi-page TU is included in a different plane. However, in some cases, two or more pages of the multi-page TU may be included in the same plane (e.g., but is a different page or page type of that plane).

In some implementations, to identify the one or more additional pages of the multi-page TU, the memory device 120 may perform a bad block determination (sometimes called a bad block search). The memory device 120 may perform the bad block determination to determine whether any pages, included in a quantity of sequential pages that follow the initial page of the multi-page TU, are included in a bad block. The quantity of sequential pages may be based on the TU size (and may be the additional pages in the TU other than the initial page). For example, for a TU size of four, there is one initial page and three additional pages. Thus, the memory device 120 may determine whether any of the three pages, that sequentially follow the initial page, are included in a bad block. When reading data for the TU, the memory device 120 may skip any pages that are included in a bad block (based on the bad block determination).

To perform the bad block determination, the memory device 120 may read a bad block data structure. As described elsewhere herein, the bad block data structure may indicate one or more bad blocks (e.g., using block identifiers) and/or one or more bad pages (e.g., using page identifiers, such as page index values). In some implementations, the bad block data structure may indicate page index values of bad pages for different types of multi-plane page stripes (e.g., SLC, DLC, TLC, and so on). In the example of FIG. 10, the bad block data structure may indicate that pages having index values of 8, 21, and 41 in the SLC multi-plane page stripe 915 are bad pages, that pages having index values of 14, 20, 39, 45, 77, and 83 in the DLC multi-plane page stripe 920 are bad pages, and that pages having index values of 20, 36, 32, 57, 63, 69, 113, and 119, 125 in the TLC multi-plane page stripe 925 are bad pages.

However, in some implementations, rather than explicitly storing an indication of all of these page index values, for a multi-plane page stripe with memory cells storing two or more bits per memory cell (e.g., for DLC, TLC, and so on), the bad block data structure may store only a single page index value per bad block (e.g., an indication of only an initial page per plane that includes a bad block). For example, rather than storing an indication that pages having page index values of 14 and 20 are bad pages, the bad block data structure may store an explicit indication only for the page index value of 14, and the memory device 120 may identify additional bad pages using an offset value equal to the number of planes per die. In example of FIG. 10, there are 6 planes per die, so for the DLC multi-plane page stripe 920, the memory device uses the indication of page index 14 to determine that the page having a page index of 20 (14+6=20) is also a bad page. Similarly, for the TLC multi-plane page stripe 925, the memory device uses the indication of page index 20 to determine that the page having a page index of 26 (20+6=26) and the page having a page index of 32 (14+6+6=32) are also bad pages. In this way, the amount of memory needed for the bad block data structure can be reduced.

Based on reading the bad block data structure, the memory device 120 may determine a set of page index values that indicate a set of bad pages of the memory device 120 for the multi-plane page stripe in which the initial page is located, sometimes called bad page index values. The memory device 120 may use a first page index value, that identifies the initial page of a multi-page TU being read, to identify a second page index value included in the set of be page index values. For example, the memory device 120 may identify the second page index value as a page index value that is closest to the first page index value (of the initial page) out of all bad page index values (associated with the same multi-plane page stripe as the first page index value) that are greater than the first page index value. In other words, the memory device 120 may identify the lowest bad page index value that is greater than the first page index value of the initial page (e.g., because the memory device 120 needs to determine whether any subsequent pages to the initial page are bad pages within the TU size).

After identifying the second page index value, from the set of bad page index values, the memory device 120 may determine whether that second page index value is within an offset threshold of the first page index value. The offset threshold may be based on the TU size (e.g., equal to the quantity of additional pages, the TU size minus one, or, in some cases, the TU size). The memory device 120 may identify the one or more additional pages of the TU based on whether the second page index value is within the offset threshold of the first page index value. If the second page index value is within the offset threshold of the first page index value, then the page having the second page index value may be skipped (e.g., not read because that page is not included in the multi-page TU). In this case, the initial page and the one or more additional pages are non-sequential and have at least one non-consecutive page index value.

If the second page index value is not within the offset threshold of the first page index value, then the page having the second page index value may be read (e.g., because that page is included in the multi-page TU). In this case, the initial page and the one or more additional pages are sequential and have consecutive page index values As an example, the memory device 120 may receive a read command indicating a multi-page TU with an initial page having a page index value of 0 within the SLC multi-plane page stripe 915. As described elsewhere herein, the memory device 120 may determine the initial page index value of 0 based on an L2P entry for the multi-page TU. The memory device 120 may determine that pages 8, 21, and 41 are bad pages within the SLC multi-plane page stripe 915, as shown in FIG. 10. The lowest page index value of the bad page index values of 8, 21, and 41 that is greater than the initial page index value of 0 is 8. In this example where the TU size is four, the quantity of additional pages is three (e.g., one less than the TU size). The memory device 120 may determine that the second page index value (8) is not within the offset threshold (3) of the initial page index value (0). Thus, the memory device 120 may read from the three sequential pages that follow page 0. In this example, the pages of the multi-page TU are sequential, and the memory device 120 may read the multi-page TU from consecutive pages 0, 1, 2, and 3.

As another example, the memory device 120 may receive a read command indicating a multi-page TU with an initial page having a page index value of 38 within the SLC multi-plane page stripe 915. Again, the memory device 120 may determine that pages 8, 21, and 41 are bad pages within the SLC multi-plane page stripe 915, as shown in FIG. 10. The lowest page index value of the bad page index values of 8, 21, and 41 that is greater than the initial page index value of 38 is 41. In this example where the TU size is four, the quantity of additional pages is three (e.g., one less than the TU size). The memory device 120 may determine that the second page index value (41) is within the offset threshold (3) of the initial page index value (38) (e.g., 38+3=41). Thus, the memory device 120 may skip page 41 when reading the multi-page TU, and may read the next page after page 41 (unless that page is also a bad page). For example, the memory device 120 may read from non-consecutive pages 38, 39, 40, and 42 (e.g., to read a multi-page TU having four pages, where page 41 is a bad page), which are also non-sequential.

If there are not any bad pages having an index value greater than the initial page index value, then the memory device 120 may read from the three sequential pages that follow the initial page index value. For example, for an initial page index value of 43 in the SLC multi-plane page stripe 915 (where the highest bad page index is 41), the memory device 120 may read the multi-page TU from pages 43, 44, 45, and 46, which are sequential and have consecutive page index values. Using this technique, the memory device 120 will not attempt to read user data from a reserved page because when writing data to a multi-page TU (as described above in connection with FIG. 9), the memory device 120 will not store a page index value (in the L2P table) that would result in reading a reserved page.

After identifying the pages of the multi-page TU (e.g., the initial page and the one or more additional pages), the memory device 120 may read data from the identified pages. In some implementations, the memory device 120 may provide the read data to the host device 110.

As indicated above, FIG. 10 is provided as an example. Other examples may differ from what is described with regard to FIG. 10.

Figure 11:
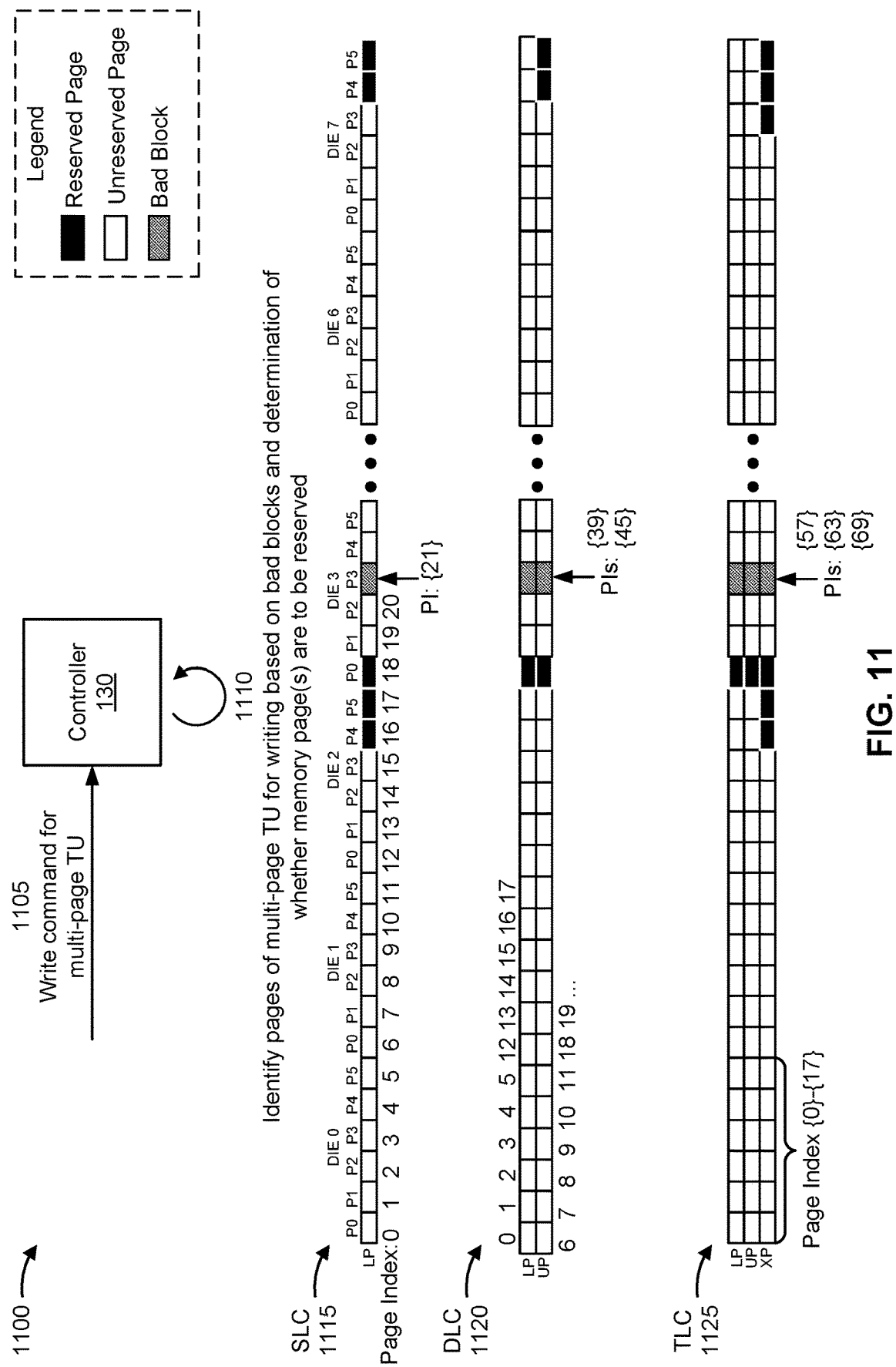
FIG. 11 is a diagram of another example of write address translation using reserved memory pages for multi-page translation units.

FIG. 11 is a diagram of an example 1100 of write address translation using reserved memory pages for multi-page translation units. The operations described in connection with FIG. 11 may be performed by the memory device 120 and/or one or more components of the memory device 120, such as the controller 130 and/or one or more components of the controller 130.

As shown by reference number 1105, the memory device 120 (e.g., the controller 130) may receive a write command for a multi-page TU, as described above in connection with reference number 905 of FIG. 9. As shown by reference number 1110, the memory device 120 (e.g., the controller 130) may identify the multiple memory pages of the TU, to which the data is to be written, based on one or more bad blocks of the memory device 120 and/or a determination of whether one or more memory pages of the memory device 120 are to be reserved.

In the example 900 of FIG. 9, the memory device 120 reserved one or more pages, at the end of each multi-plane page stripe, from which a full TU (having the TU size configured from the memory device 120) could not be formed. This technique may maximize the use of pages while prohibiting multi-plane page stripe crossing, but may result in a complex bad block determination that consumes processing resources during read address translation, as described above in connection with FIG. 10. The techniques described in connection with FIGS. 11-15 reduce complexity and processing resources needed for read address translation.

In some implementations, when writing data for a multi-page TU, the memory device 120 may identify a multi-plane page (sometimes called an initial multi-plane page) that includes an initial memory page for the multi-page TU. For example, the memory device 120 may look up a write cursor, which may indicate the initial memory page and/or the multi-plane page that includes the initial memory page. The memory device 120 may determine whether the multi-plane page includes any bad blocks (e.g., bad pages) and may also determine whether the next sequential multi-plane page, that follows that multi-plane page, includes any bad blocks. The next sequential multi-plane page is the next multi-plane page (e.g., of the next die) that would be written to in the same multi-plane page stripe. For example, if the initial page for an SLC multi-plane page stripe 1115 has a page index of 0, then the initial multi-plane page includes pages 0 through 5 on die 0, and the next sequential multi-plane page includes pages 6 through 10 on die 1.

If the initial multi-plane page does not include any bad blocks (e.g., as determined from the bad block data structure) and the next sequential multi-plane page does not include any bad blocks (e.g., as determined from the bad block data structure), then the memory device 120 may refrain from reserving any memory pages of the initial multi-plane page and may refrain from reserving any memory pages of the next sequential multi-plane page. This assists with improving resource utilization. For example, in the SLC multi-plane page stripe 1115, the memory device 120 does not reserve any pages of die 0 and does not reserve any pages of die 1. In some implementations, if the initial multi-plane page (e.g., that includes the initial page of the TU to be written) does not include any bad blocks, then the initial page may be selected to have a page index value that is even (e.g., 0, 2, 4, and so on) or that otherwise satisfies a condition. Additionally, or alternatively, if the initial multi-plane page does not include any bad blocks, then the initial page may be selected such that a plane index value, of a plane that includes the initial page, is even (e.g., 0, 2, 4, and so on) or otherwise satisfies a condition. This may simplify read address translation, as described in more detail elsewhere herein.

When the memory device 120 does not reserve any pages in consecutive multi-plane pages, the memory device 120 may select sequential pages (of one of those multi-plane pages or from both of those multi-plane pages) for writing to the multi-page TU. For example, the memory device 120 may select a single set of sequential memory pages that are all included in the initial multi-plane page, such as pages 0 through 3 (e.g., when the initial page is page 0). As another example, the memory device 120 may select a first set of sequential memory pages included in the initial multi-plane page and a second set of sequential memory pages included in the next sequential multi-plane page, such as pages 4 through 7 (e.g., when the initial page is page 4). In some implementations, this crossing of multi-plane pages only occurs if a quantity of planes per die is not a power of two (e.g., is not 2', such as 2, 4, 8, 16, and so on), such as in the example of FIG. 11. In other words, for some combinations of TU size and planes per die, crossing of multi-plane pages may not be necessary to construct full TUs having the TU size when there are no bad blocks in a multi-plane page.

If the initial multi-plane page includes a bad block (e.g., as determined from the bad block data structure) or the next sequential multi-plane page includes a bad block (e.g., as determined from the bad block data structure), then the memory device 120 may reserve at least one memory page of the initial multi-plane page. For example, if the initial multi-plane page includes a bad block, then the memory device 120 may reserve at least one memory page to cause a page index value of the initial page and/or a plane index value, of a memory plane that includes the initial memory page, to be odd (e.g., 1, 3, 5, and so on) or to otherwise satisfy a condition. For example, in the SLC multi-plane page stripe 1115, if the initial page is in die 3, which has a bad page (page 21) in plane 3, then the memory device 120 reserves page 18 (in plane 0 of die 3). This causes page 19 (an odd-numbered page) in plane 1 (an odd-numbered plane) of to be the initial page of the multi-page TU. Using an even-numbered page index and/or plane index for an initial page when there are no bad blocks in the initial multi-page plane and using an odd-numbered page index and/or plane index for an initial page when there is at least on bad block in the initial multi-page plane may simplify read address translation, as described in more detail elsewhere herein.

As another example, if the next sequential multi-plane page includes a bad block, then the memory device 120 may reserve at least one memory page at the end of the initial multi-plane page, such as when a remaining quantity of unwritten pages in the initial multi-plane page is less than the TU size. For example, in the SLC multi-plane page stripe 1115, if the initial page is page 12 (in plane 0 of die 2, which has no bad blocks), then the memory device 120 may write the multi-page TU to pages 12 through 15. To avoid crossing over to the next sequential multi-plane page (of die 3), which includes a bad block, the memory device 120 may reserve pages 16 and 17 at the end of the multi-plane page of die 2 because the memory device 120 cannot form a full TU having four pages within the multi-plane page of die 2. This may simplify read address translation by eliminating the need for the bad block determination described above in connection with FIG. 10.

When the memory device 120 reserves a page, the memory device 120 does not write user data to that page and does not include that page in a multi-page TU. In addition to the techniques described in connection with FIG. 11, the memory device 120 may reserve one or more pages at the end of a multi-page page stripe (e.g., when a full TU cannot be formed), as described above in connection with FIG. 9. Furthermore, the memory device 120 may unreserve pages and/or may reserve different pages upon detecting a new bad block, as described elsewhere herein. Furthermore, the memory device 120 may reserve pages in a similar manner as described in connection with FIG. 11 for a DLC multi-plane page stripe 1120 and/or for a TLC multi-plane page stripe 1125. Additional details of using the techniques of FIG. 11 are described below in connection with FIGS. 12-15.

As indicated above, FIG. 11 is provided as an example. Other examples may differ from what is described with regard to FIG. 11.

Figure 12:
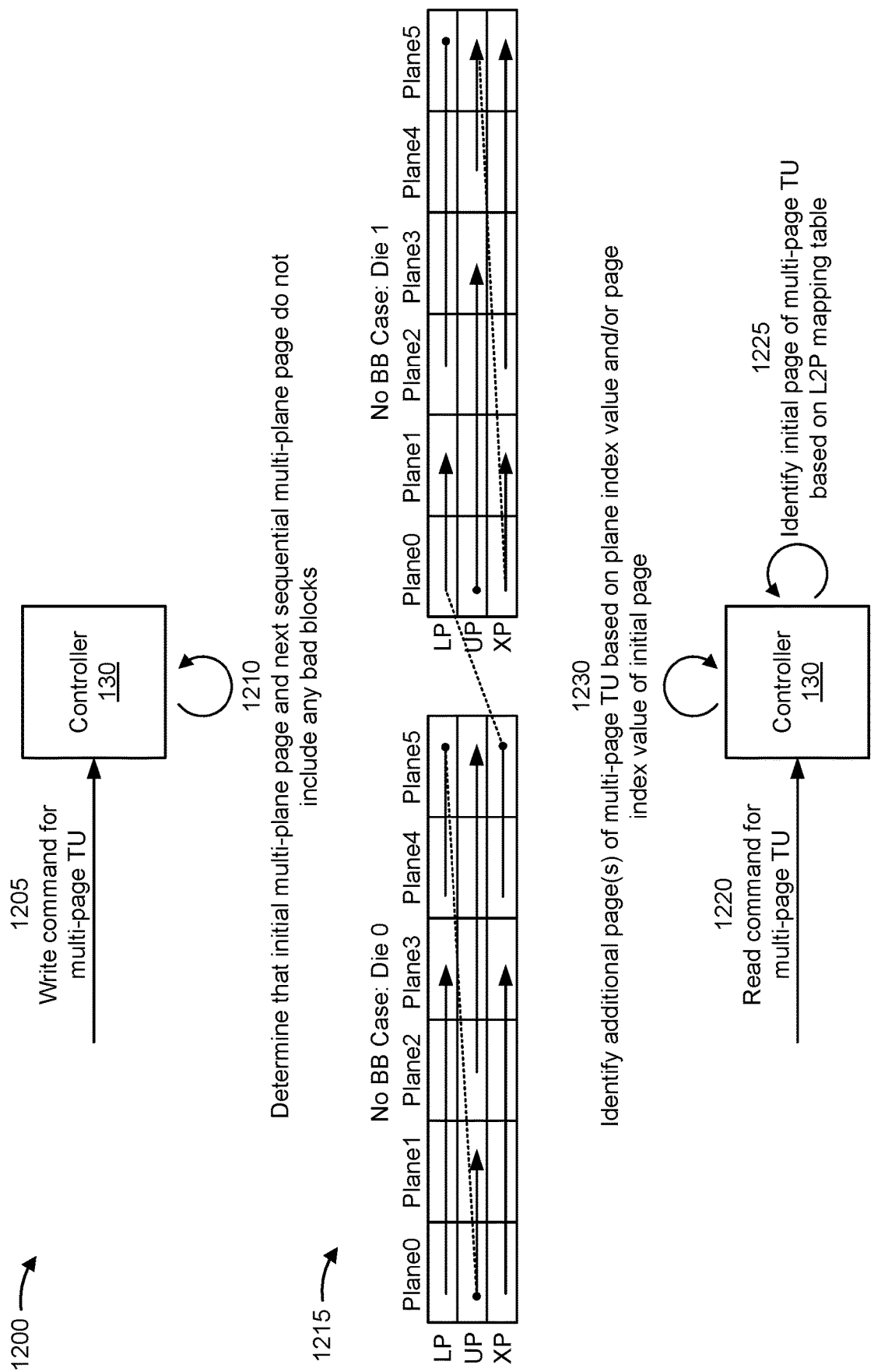
FIGS. 12-15 are diagrams of examples of write address translation and read address translation using techniques described herein.

FIG. 12 is a diagram of an example 1200 of write address translation and read address translation using the techniques described above in connection with FIG. 11. The operations described in connection with FIG. 12 may be performed by the memory device 120 and/or one or more components of the memory device 120, such as the controller 130 and/or one or more components of the controller 130.

As shown by reference number 1205, the memory device 120 (e.g., the controller 130) may receive a write command for a multi-page TU, as described above in connection with reference number 905 of FIG. 9. As shown by reference number 1210, the memory device 120 (e.g., the controller 130) may determine that the initial multi-plane page (e.g., that includes an initial page to be written) and the next sequential multi-plane page (as described elsewhere herein) do not include any bad blocks. For example, the memory device 120 may make this determination when identifying the pages of a multi-page TU to which data is to be written.

As shown by reference number 1215, in FIG. 12, the initial multi-plane page is a TLC multi-plane page that includes six planes (Plane 0 through Plane 5) on Die 0, and the next sequential multi-plane page is a TLC multi-plane page that includes six planes (Plane 0 through Plane 5) on Die 1. As shown, there are no bad blocks (and no bad pages) in either of these multi-plane pages. As a result, the memory device 120 may refrain from reserving any memory pages of the initial multi-plane page and may refrain from reserving any memory pages of the next sequential multi-plane page, as described above in connection with FIG. 11. Furthermore, the memory device 120 may enable crossing of multi-plane pages. This assists with improving resource utilization. For example, all of the pages of the initial multi-plane page and the next sequential multi-plane page are written to multi-page TUs, such as a first multi-page TU in the LPs of Planes 0 through 3 on Die 0, a second multi-page TU in the LPs of Plane 4 and Plane 5 of Die 0 and the UPs of Plane 0 and Plane 1 of Die 0, and so on.

As shown by reference number 1220, the memory device 120 (e.g., the controller 130) may receive a read command for a multi-page TU, as described above in connection with reference number 1005 of FIG. 10. As shown by reference number 1225, the memory device 120 (e.g., the controller 130) may identify an initial page of the multi-page TU based on an L2P mapping table, as described elsewhere herein.

As shown by reference number 1230, the memory device 120 (e.g., the controller 130) may identify one or more additional pages of the multi-page TU based on an index value associated with the initial page. The index value may be, for example, a plane index value (e.g., that identifies a plane that includes the initial page) or a page index value (e.g., that identifies the initial page, such as a page index value described above in connection with FIGS. 9-11). The memory device 120 may determine the index value using the L2P mapping table. For example, an L2P entry may indicate a TU (e.g., a multi-page TU) and, among other things, a plane index value and/or a page index value associated with an initial page of that TU.

The memory device 120 may use the index value to identify one or more additional pages of the multi-page TU. For example, if the index value satisfies a condition (e.g., a first condition), then the memory device 120 may identify sequential (or consecutive) pages (e.g., the initial page and the one or more additional pages) as the pages of the multi-page TU. As an example, if the index value (e.g., the plane index value or the page index value) is even, then the memory device 120 may identify sequential pages (e.g., the initial page and the one or more additional pages) as the pages of the multi-page TU. Additionally, or alternatively, if the index value satisfies the first condition (e.g., is even), then the memory device 120 may refrain from performing the bad block determination, described above in connection with FIG. 10, when identifying the one or more additional memory pages. This conserves processing resources and simplifies read address translation.

After identifying the pages of the multi-page TU (e.g., the initial page and the one or more additional pages), the memory device 120 may read data from the identified pages. In some implementations, the memory device 120 may provide the read data to the host device 110.

As indicated above, FIG. 12 is provided as an example. Other examples may differ from what is described with regard to FIG. 12.

Figure 13:
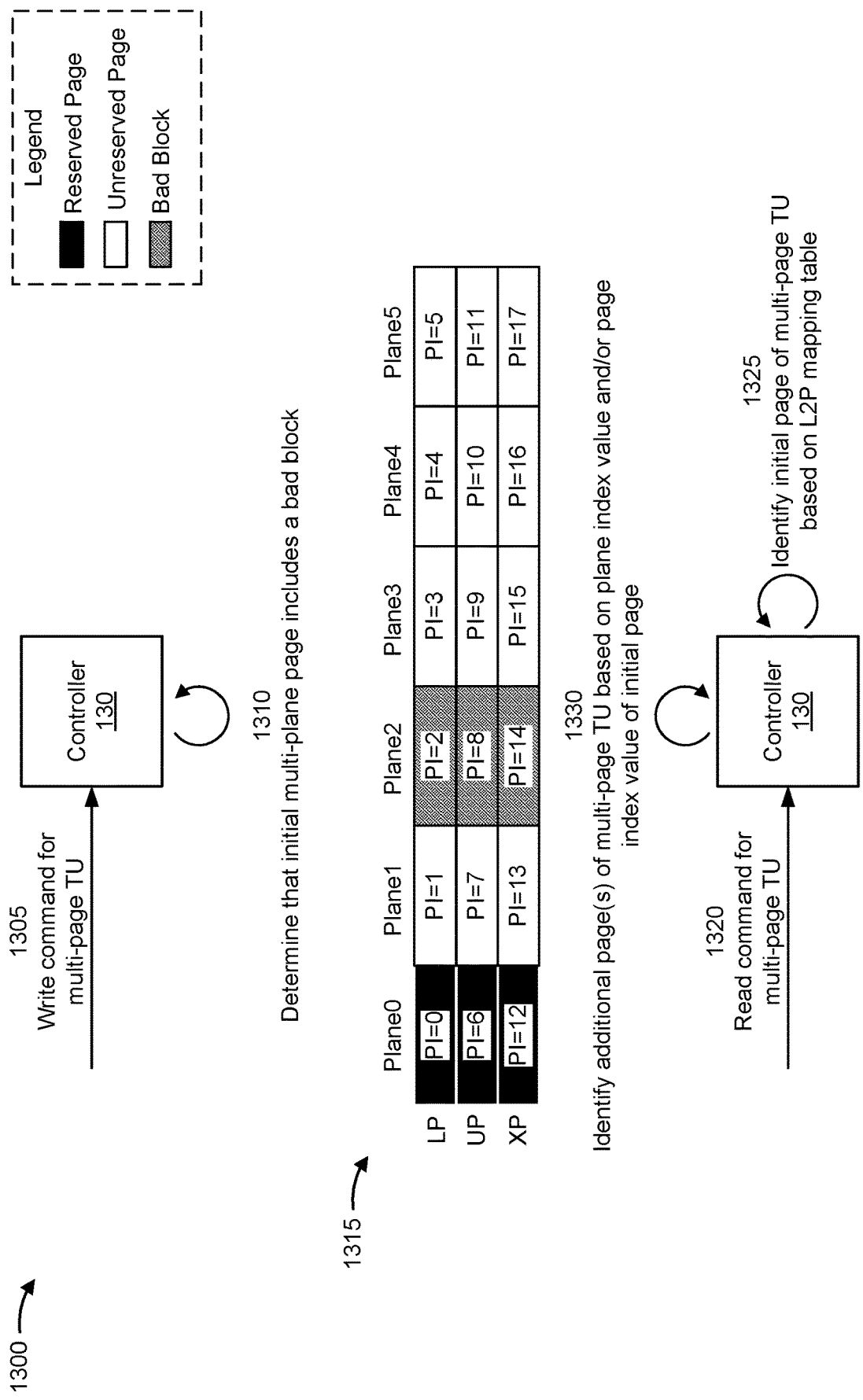

FIG. 13 is a diagram of an example 1300 of write address translation and read address translation using the techniques described above in connection with FIG. 11. The operations described in connection with FIG. 13 may be performed by the memory device 120 and/or one or more components of the memory device 120, such as the controller 130 and/or one or more components of the controller 130.

As shown by reference number 1305, the memory device 120 (e.g., the controller 130) may receive a write command for a multi-page TU, as described above in connection with reference number 905 of FIG. 9. As shown by reference number 1310, the memory device 120 (e.g., the controller 130) may determine that the initial multi-plane page (e.g., that includes an initial page to be written) includes a bad block (e.g., at least one bad block). For example, the memory device 120 may make this determination when identifying the pages of a multi-page TU to which data is to be written, as described above in connection with FIGS. 9 and 11.

As shown by reference number 1315, in FIG. 13, the initial multi-plane page is a TLC multi-plane page that includes six planes (Plane 0 through Plane 5). As shown, Plane 2 includes a bad block in the pages of the illustrated multi-plane page (e.g., in the pages having respective page indexes of 2, 8, and 14). As a result, the memory device 120 may reserve one or more memory pages of the initial multi-plane page, as described above in connection with FIG. 11. In some implementations, the memory device 120 may reserve one or more memory pages to cause an index value associated with the initial memory page to be written (e.g., a page index value of the initial memory page or a plane index value of a memory plane that includes the initial memory page), to satisfy a condition (e.g., a second condition), such as to have an odd value. Additionally, or alternatively, the memory device 120 may disable crossing of multi-plane pages, which may reduce complexity associated with read address translation.

For example, in FIG. 13, the memory device 120 reserves the first page of the multi-plane page, shown as having a page index value of 0 and included in a plane having a plane index value of 0. This prevents the initial page of the TU from being associated with an even page index value and/or an even plane index value. The memory device 120 may use the page having a page index value of 1 (and included in the plane having a plane index value of 1) as the initial page, which has an odd value. During read address translation, this may signal that a bad block determination needs to be performed to identify the one or more additional pages. Because page 2 is a bad page, the first multi-page TU of the illustrated multi-plane page includes pages 1, 3, 4, and 5.

When writing the second multi-page TU to the illustrated multi-plane page, the memory device 120 reserves page 6 (an even-numbered page) rather than using page 6 as the initial page of the second multi-page TU, and the memory device 120 uses page 7 (an odd-numbered page) as the initial page of the second multi-page TU, again to signal that a bad block determination is to be performed during read address translation. Similarly, when writing the third multi-page TU to the illustrated multi-plane page, the memory device 120 reserves page 12 rather than using page 12 as the initial page of the third multi-page TU, and the memory device 120 uses page 13 (an odd-numbered page) as the initial page of the third multi-page TU, again to signal that a bad block determination is to be performed during read address translation.

As shown by reference number 1320, the memory device 120 (e.g., the controller 130) may receive a read command for a multi-page TU, as described above in connection with reference number 1005 of FIG. 10. As shown by reference number 1325, the memory device 120 (e.g., the controller 130) may identify an initial page of the multi-page TU based on an L2P mapping table, as described elsewhere herein.

As shown by reference number 1330, the memory device 120 (e.g., the controller 130) may identify one or more additional pages of the multi-page TU based on an index value (e.g., a plane index value or a page index value, as described elsewhere herein) associated with the initial page.

The memory device 120 may use the index value to identify one or more additional pages of the multi-page TU. For example, if the index value satisfies a second condition (e.g., is odd), then the memory device 120 may perform a bad block determination, as described above in connection with FIG. 9, to identify the one or more additional pages. Thus, the memory device 120 may select an index value associated with the initial page (e.g., by reserving or refraining from reserving one or more pages) during write address translation to signal whether a bad block determination needs to be performed during read address translation. For example, if the memory device 120 selects an even index value (e.g., 0), then this may indicate that there are no bad blocks in the multi-plane page that includes the initial page, and the memory device 120 can forego the bad block determination after identifying the initial page during read address translation (e.g., and can read from consecutive pages in the multi-page TU). However, if the memory device 120 selects an odd index value, then this may indicate that there is at least one bad block in the multi-plane page that includes the initial page, and the memory device 120 must perform the bad block determination after identifying the initial page during read address translation (e.g., to identify which pages to skip during read address translation for the multi-page TU). This conserves processing resources as compared to performing the bad block determination during every read address translation.

After identifying the pages of the multi-page TU (e.g., the initial page and the one or more additional pages), the memory device 120 may read data from the identified pages. In some implementations, the memory device 120 may provide the read data to the host device 110.

As indicated above, FIG. 13 is provided as an example. Other examples may differ from what is described with regard to FIG. 13.

Figure 14:
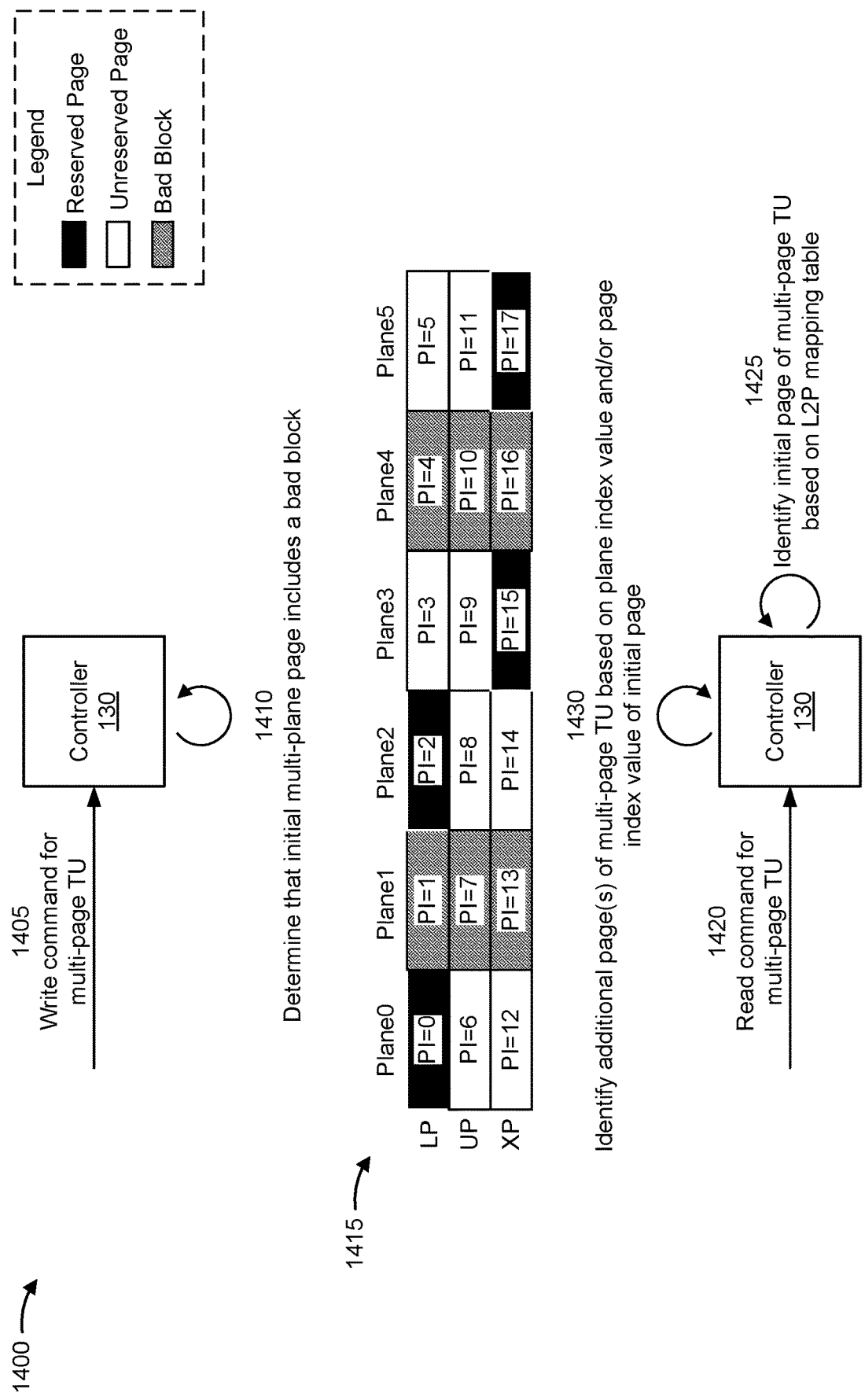

FIG. 14 is a diagram of an example 1400 of write address translation and read address translation using the techniques described above in connection with FIG. 11. The operations described in connection with FIG. 14 may be performed by the memory device 120 and/or one or more components of the memory device 120, such as the controller 130 and/or one or more components of the controller 130.

As shown by reference number 1405, the memory device 120 (e.g., the controller 130) may receive a write command for a multi-page TU, as described above in connection with reference number 905 of FIG. 9. As shown by reference number 1410, the memory device 120 (e.g., the controller 130) may determine that the initial multi-plane page (e.g., that includes an initial page to be written) includes a bad block (e.g., at least one bad block). For example, the memory device 120 may make this determination when identifying the pages of a multi-page TU to which data is to be written, as described above in connection with FIGS. 9 and 11.

As shown by reference number 1415, in FIG. 14, the initial multi-plane page is a TLC multi-plane page that includes six planes (Plane 0 through Plane 5). As shown, Plane 1 and Plane 4 each includes a bad block in the pages of the illustrated multi-plane page (e.g., in the pages having respective page indexes of 1, 4, 7, 10, 13, and 16). As a result, the memory device 120 may reserve one or more memory pages of the initial multi-plane page, as described above in connection with FIG. 11. In some implementations, the memory device 120 may reserve one or more memory pages to cause an index value associated with the initial memory page to be written (e.g., a page index value of the initial memory page or a plane index value of a memory plane that includes the initial memory page), to satisfy a condition (e.g., a second condition), such as to have an odd value. Additionally, or alternatively, the memory device 120 may disable crossing of multi-plane pages, which may reduce complexity associated with read address translation.

For example, in FIG. 14, the memory device 120 reserves the first page of the multi-plane page, shown as having a page index value of 0 and included in a plane having a plane index value of 0. This prevents the initial page of the TU from being associated with an even page index value and/or an even plane index value. The memory device 120 may skip the bad page having a page index value of 1. The memory device 120 may also reserve the page having a page index value of 2 (and included in a plane having a plane index value of 2) to prevent the initial page of the TU from being associated with an even page index value and/or an even plane index value. The memory device 120 may use the page having a page index value of 3 (and included in the plane having a plane index value of 3) as the initial page, which has an odd value. During read address translation, this may signal that a bad block determination needs to be performed to identify the one or more additional pages. Because page 1 and page 4 are bad pages, the first multi-page TU of the illustrated multi-plane page includes pages 3, 5, 6, and 8.

When writing the second multi-page TU to the illustrated multi-plane page, the memory device 120 uses the next available page, shown as page 9, as the initial page of the second multi-page TU (rather than reserving that page) because 9 is an odd number, which signals that a bad block determination is to be performed during read address translation. The second multi-page TU of the illustrated multi-plane page includes pages 9, 11, 12, and 14. The memory device 120 then reserves pages 15 and 17 because multi-plane page crossing is disabled and these two pages cannot form a full TU (having a size of four pages).

As shown by reference number 1420, the memory device 120 (e.g., the controller 130) may receive a read command for a multi-page TU, as described above in connection with reference number 1005 of FIG. 10. As shown by reference number 1425, the memory device 120 (e.g., the controller 130) may identify an initial page of the multi-page TU based on an L2P mapping table, as described elsewhere herein. As shown by reference number 1430, the memory device 120 (e.g., the controller 130) may identify one or more additional pages of the multi-page TU based on an index value (e.g., a plane index value or a page index value, as described elsewhere herein) associated with the initial page. Because the index value associated with the initial page is odd, the memory device 120 may perform a bad block determination to identify the one or more additional pages, as described above in connection with FIG. 9 and FIG. 13.

After identifying the pages of the multi-page TU (e.g., the initial page and the one or more additional pages), the memory device 120 may read data from the identified pages. In some implementations, the memory device 120 may provide the read data to the host device 110.

As indicated above, FIG. 14 is provided as an example. Other examples may differ from what is described with regard to FIG. 14.

Figure 15:
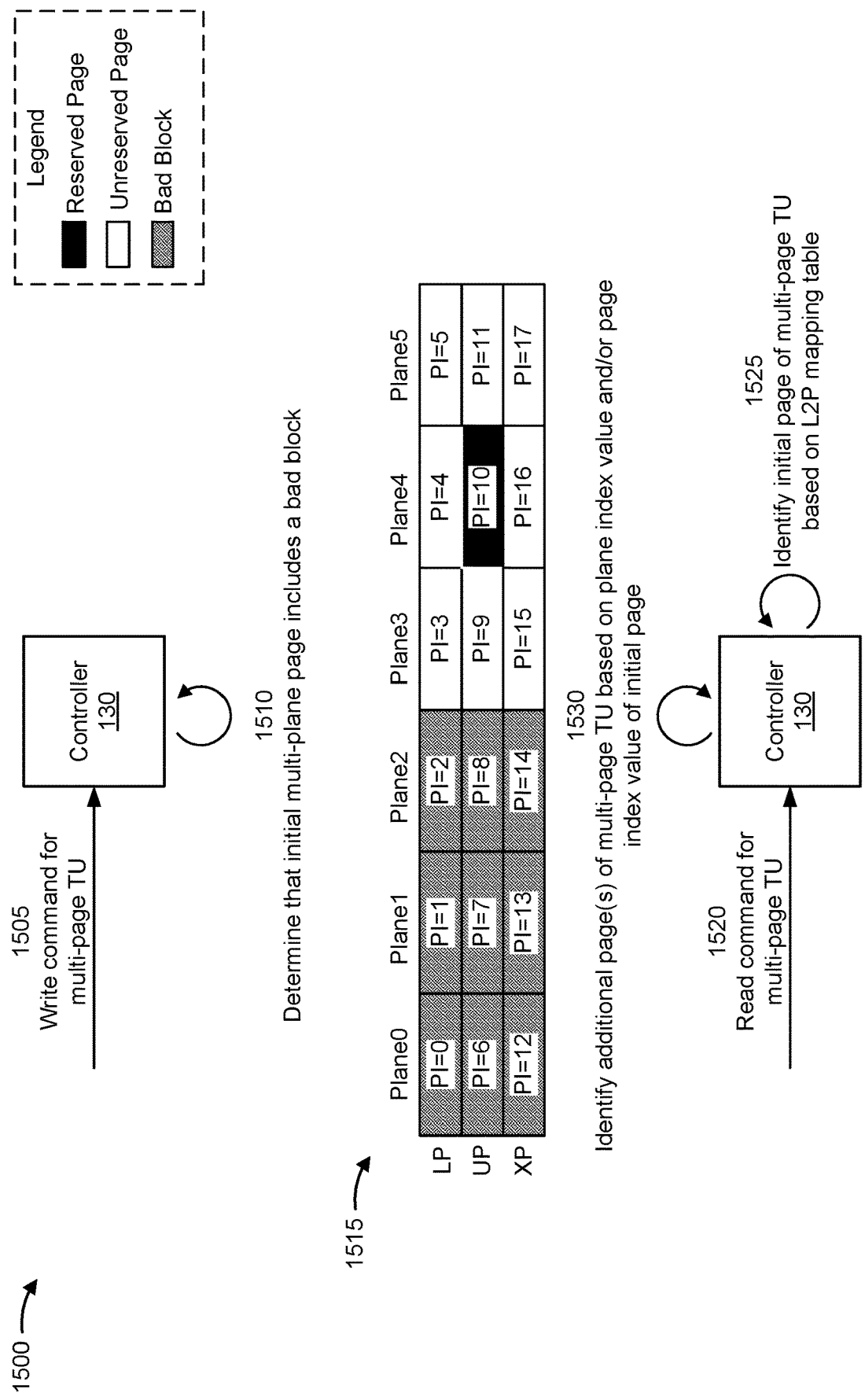

FIG. 15 is a diagram of an example 1500 of write address translation and read address translation using the techniques described above in connection with FIG. 11. The operations described in connection with FIG. 15 may be performed by the memory device 120 and/or one or more components of the memory device 120, such as the controller 130 and/or one or more components of the controller 130.

As shown by reference number 1505, the memory device 120 (e.g., the controller 130) may receive a write command for a multi-page TU, as described above in connection with reference number 905 of FIG. 9. As shown by reference number 1510, the memory device 120 (e.g., the controller 130) may determine that the initial multi-plane page (e.g., that includes an initial page to be written) includes a bad block (e.g., at least one bad block). For example, the memory device 120 may make this determination when identifying the pages of a multi-page TU to which data is to be written, as described above in connection with FIGS. 9 and 11.

As shown by reference number 1515, in FIG. 15, the initial multi-plane page is a TLC multi-plane page that includes six planes (Plane 0 through Plane 5). As shown, Plane 0, Plane 1, and Plane 2 each includes a bad block in the pages of the illustrated multi-plane page (e.g., in the pages having respective page indexes of 0, 1, 2, 6, 7, 8, 12, 13, and 14). As a result, the memory device 120 may reserve one or more memory pages of the initial multi-plane page, as described elsewhere herein For example, in FIG. 15, the memory device 120 uses page 3 (of plane 3) as the initial page because the index value (e.g., the page index value and the plane index value) is an odd number. During read address translation, this may signal that a bad block determination needs to be performed to identify the one or more additional pages. Because page 6, page 7, and page 8 are bad pages, the first multi-page TU of the illustrated multi-plane page includes pages 3, 4, 5, and 9.

When writing the second multi-page TU to the illustrated multi-plane page, the memory device 120 reserves page 10 because page 10 is an even-numbered page. The memory device 120 then uses page 11 as the initial page of the second multi-page TU because 11 is an odd number, which signals that a bad block determination is to be performed during read address translation. The second multi-page TU of the illustrated multi-plane page includes pages 11, 15, 16, 17. In this case, the memory device 120 does not need to reserve any pages at the end of the multi-plane page.

As shown by reference number 1520, the memory device 120 (e.g., the controller 130) may receive a read command for a multi-page TU, as described above in connection with reference number 1005 of FIG. 10. As shown by reference number 1525, the memory device 120 (e.g., the controller 130) may identify an initial page of the multi-page TU based on an L2P mapping table, as described elsewhere herein. As shown by reference number 1530, the memory device 120 (e.g., the controller 130) may identify one or more additional pages of the multi-page TU based on an index value (e.g., a plane index value or a page index value, as described elsewhere herein) associated with the initial page. Because the index value associated with the initial page is odd, the memory device 120 may perform a bad block determination to identify the one or more additional pages, as described above in connection with FIG. 9 and FIG. 13.

After identifying the pages of the multi-page TU (e.g., the initial page and the one or more additional pages), the memory device 120 may read data from the identified pages. In some implementations, the memory device 120 may provide the read data to the host device 110.

As indicated above, FIG. 15 is provided as an example. Other examples may differ from what is described with regard to FIG. 15.

Figure 16:
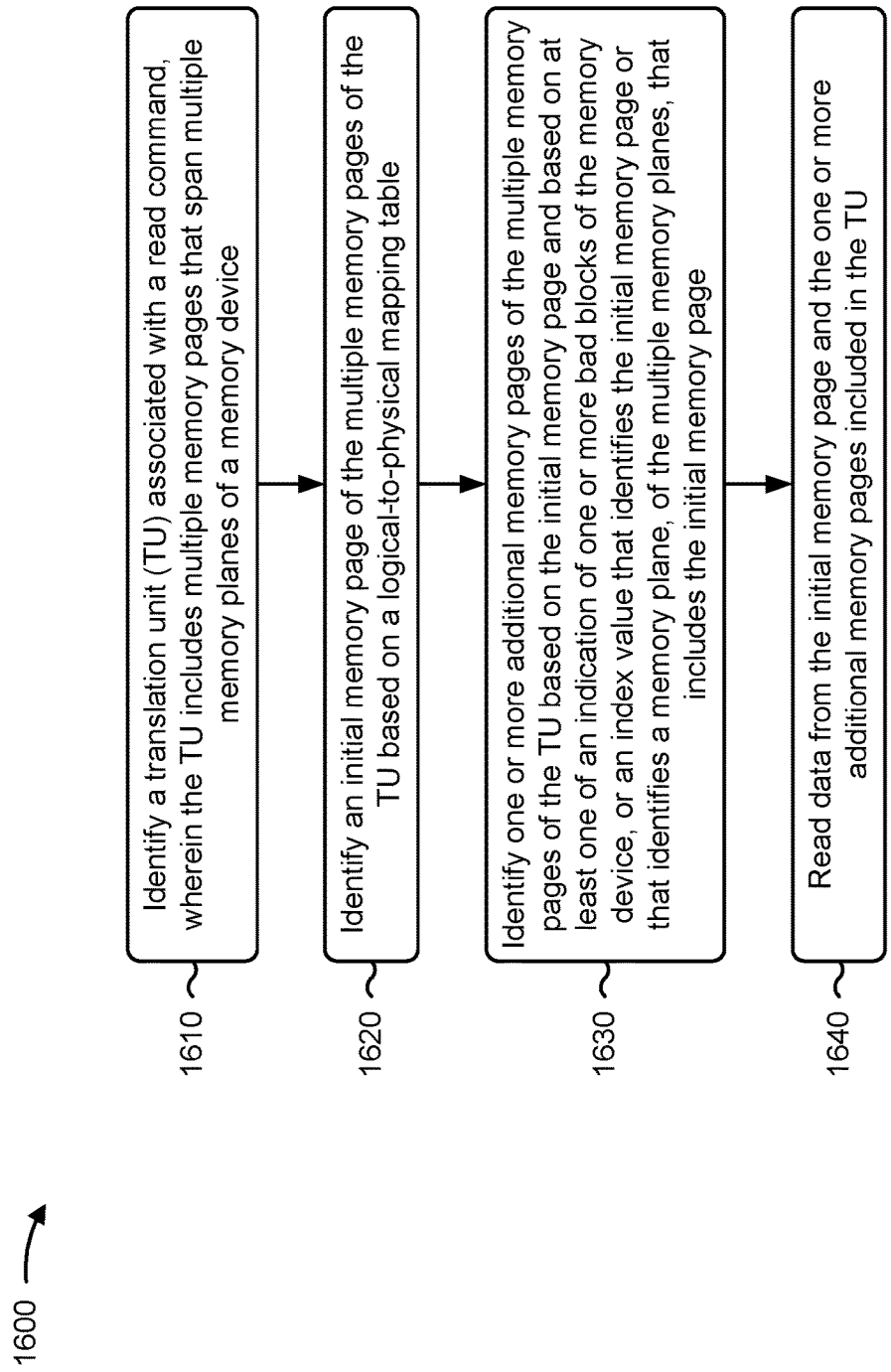
FIGS. 16-20 are flowcharts of example methods of read address translation and write address translation using reserved memory pages for multi-page translation units

FIG. 16 is a flowchart of an example method 1600 associated with read and write address translation using reserved memory pages for multi-page translation units. In some implementations, a memory device (e.g., the memory device 120) may perform or may be configured to perform the method 1600. In some implementations, another device or a group of devices separate from or including the memory device (e.g., the system 100) may perform or may be configured to perform the method 1600. Additionally, or alternatively, one or more components of the memory device (e.g., the controller 130, the memory management component 225, the address translation component 230, the page reservation component 235, and/or the command execution component 240) may perform or may be configured to perform the method 1600. Thus, means for performing the method 1600 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 1600.

As shown in FIG. 16, the method 1600 may include identifying a TU associated with a read command, wherein the TU includes multiple memory pages that span multiple memory planes of the memory device (block 1610). As further shown in FIG. 16, the method 1600 may include identifying an initial memory page of the multiple memory pages of the TU based on a logical-to-physical mapping table (block 1620). As further shown in FIG. 16, the method 1600 may include identifying one or more additional memory pages of the multiple memory pages of the TU based on the initial memory page and based on at least one of: an indication of one or more bad blocks of the memory device, or an index value that identifies the initial memory page or that identifies a memory plane, of the multiple memory planes, that includes the initial memory page (block 1630). As further shown in FIG. 16, the method 1600 may include reading data from the initial memory page and the one or more additional memory pages included in the TU (block 1640).

The method 1600 may include additional aspects, such as any single aspect or any combination of aspects described below and/or described in connection with one or more other methods or operations described elsewhere herein.

In a first aspect, all memory pages included in the TU are included in a single multi-plane page stripe and a single multi-plane block stripe.

In a second aspect, alone or in combination with the first aspect, at least one memory page of the TU is included in a first multi-plane page and at least one other memory page of the TU is included in a second multi-plane page.

In a third aspect, alone or in combination with one or more of the first and second aspects, all memory pages included in the TU are unreserved memory pages, and wherein a multi-plane page stripe, that includes the TU, includes one or more reserved memory pages to which user data is not to be written.

In a fourth aspect, alone or in combination with one or more of the first through third aspects, the one or more reserved memory pages is a quantity of reserved memory pages, located at an end of the multi-plane page stripe, that is less than a quantity of memory pages included in the TU.

In a fifth aspect, alone or in combination with one or more of the first through fourth aspects, the quantity of reserved memory pages located at the end of the multi-plane page stripe is based on a quantity of bits stored per memory cell included in the multi-plane page stripe.

In a sixth aspect, alone or in combination with one or more of the first through fifth aspects, the method 1600 includes detecting a new bad block of the memory device, and marking a memory page, of the one or more reserved memory pages, as an unreserved memory page based on detecting the new bad block, wherein marking the memory page as an unreserved memory page enables the memory device to write user data to the memory page.

Although FIG. 16 shows example blocks of a method 1600, in some implementations, the method 1600 may include additional blocks, fewer blocks, different blocks, or differently arranged blocks than those depicted in FIG. 16. Additionally, or alternatively, two or more of the blocks of the method 1600 may be performed in parallel. The method 1600 is an example of one method that may be performed by one or more devices described herein. These one or more devices may perform or may be configured to perform one or more other methods based on operations described herein.

Figure 17:
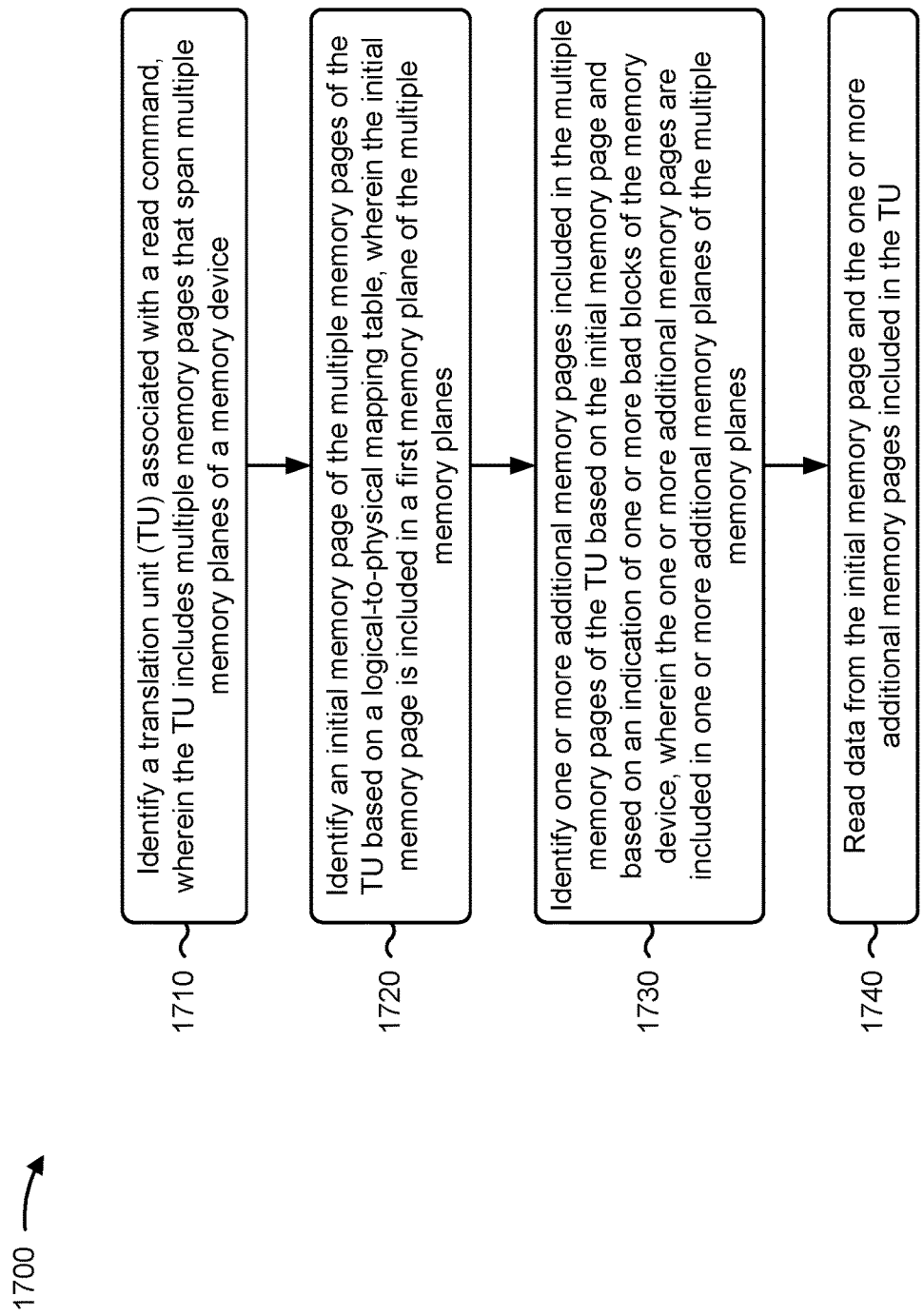

FIG. 17 is a flowchart of an example method 1700 associated with read and write address translation using reserved memory pages for multi-page translation units. In some implementations, a memory device (e.g., the memory device 120) may perform or may be configured to perform the method 1700. In some implementations, another device or a group of devices separate from or including the memory device (e.g., the system 100) may perform or may be configured to perform the method 1700.

Additionally, or alternatively, one or more components of the memory device (e.g., the controller 130, the memory management component 225, the address translation component 230, the page reservation component 235, and/or the command execution component 240) may perform or may be configured to perform the method 1700. Thus, means for performing the method 1700 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 1700.

As shown in FIG. 17, the method 1700 may include identifying a TU associated with a read command, wherein the TU includes multiple memory pages that span multiple memory planes of the memory device (block 1710). As further shown in FIG. 17, the method 1700 may include identifying an initial memory page of the multiple memory pages of the TU based on a logical-to-physical mapping table, wherein the initial memory page is included in a first memory plane of the multiple memory planes (block 1720). As further shown in FIG. 17, the method 1700 may include identifying one or more additional memory pages included in the multiple memory pages of the TU based on the initial memory page and based on an indication of one or more bad blocks of the memory device, wherein the one or more additional memory pages are included in one or more additional memory planes of the multiple memory planes (block 1730). As further shown in FIG. 17, the method 1700 may include reading data from the initial memory page and the one or more additional memory pages included in the TU (block 1740).

The method 1700 may include additional aspects, such as any single aspect or any combination of aspects described below and/or described in connection with one or more other methods or operations described elsewhere herein.

In a first aspect, the method 1700 includes identifying a first page index value that identifies the initial memory page, determining, based on the indication of the one or more bad blocks of the memory device, a set of page index values that indicate a set of bad pages of the memory device, identifying a second page index value that is closest to the first page index value out of all page index values, included in the set of page index values, that are greater than the first page index value, determining whether the second page index value is within an offset threshold of the first page index value, and identifying the one or more additional memory pages of the TU based on whether the second page index value is within the offset threshold of the first page index value.

In a second aspect, alone or in combination with the first aspect, the method 1700 includes identifying the one or more additional memory pages of the TU as one or more sequential memory pages based on a determination that the second page index value is not within the offset threshold of the first page index value, wherein the initial memory page and the one or more sequential memory pages have consecutive page index values.

In a third aspect, alone or in combination with one or more of the first and second aspects, the method 1700 includes identifying the one or more additional memory pages of the TU as one or more non-sequential memory pages based on a determination that the second page index value is within the offset threshold of the first page index value, wherein the initial memory page and the one or more non-sequential memory pages have at least one non-consecutive page index value.

In a fourth aspect, alone or in combination with one or more of the first through third aspects, the offset threshold is based on a quantity of memory pages included in the TU.

In a fifth aspect, alone or in combination with one or more of the first through fourth aspects, the indication of the one or more bad blocks of the memory device includes a data structure that stores an indication of a set of page index values corresponding to a set of pages that are included in the one or more bad blocks.

In a sixth aspect, alone or in combination with one or more of the first through fifth aspects, for memory cells that store two or more bits per memory cell, the data structure stores an indication of only an initial page per plane for each plane that includes a bad block.

Although FIG. 17 shows example blocks of a method 1700, in some implementations, the method 1700 may include additional blocks, fewer blocks, different blocks, or differently arranged blocks than those depicted in FIG. 17. Additionally, or alternatively, two or more of the blocks of the method 1700 may be performed in parallel. The method 1700 is an example of one method that may be performed by one or more devices described herein. These one or more devices may perform or may be configured to perform one or more other methods based on operations described herein.

Figure 18:
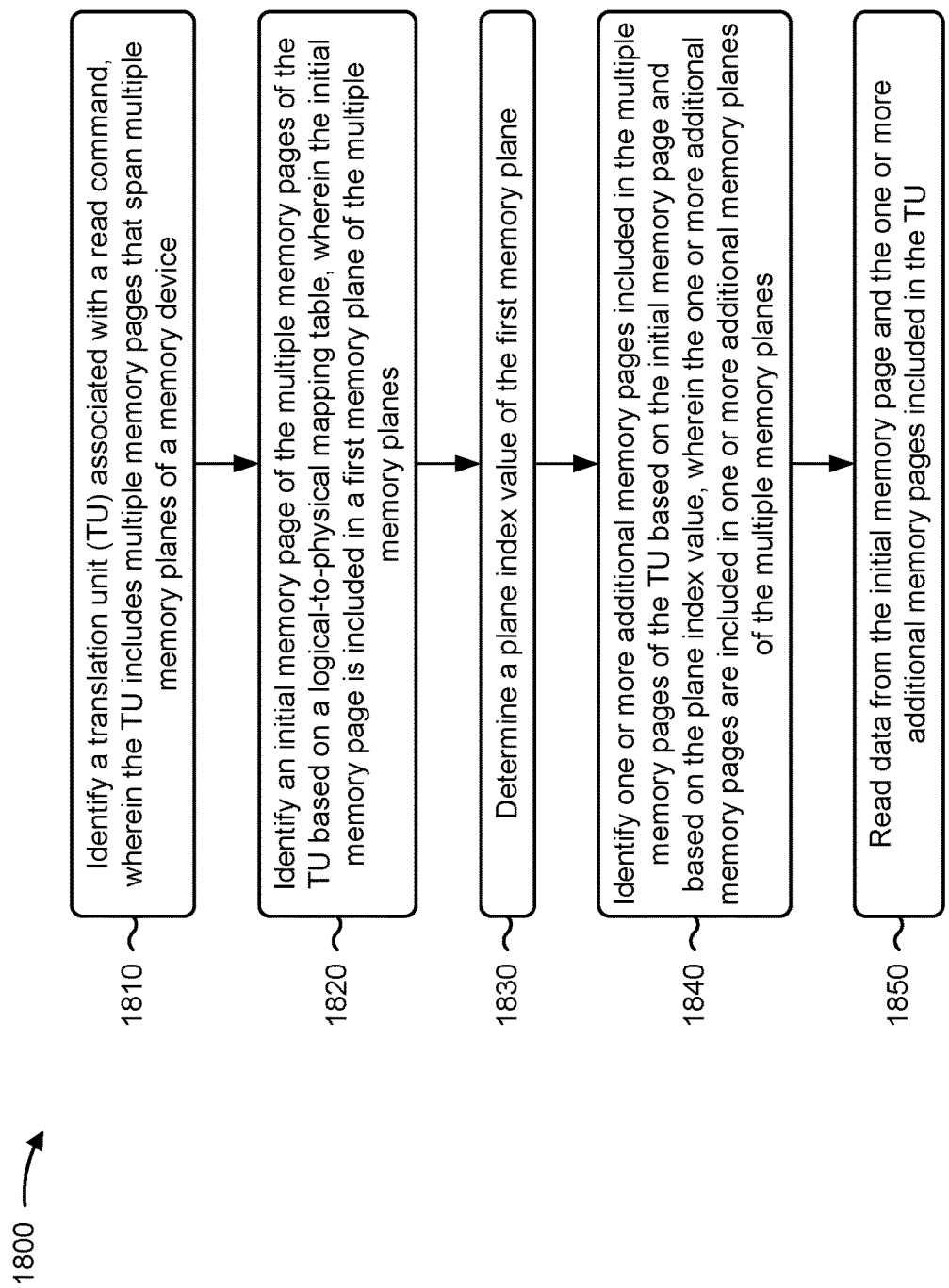

FIG. 18 is a flowchart of an example method 1800 associated with read and write address translation using reserved memory pages for multi-page translation units. In some implementations, a memory device (e.g., the memory device 120) may perform or may be configured to perform the method 1800. In some implementations, another device or a group of devices separate from or including the memory device (e.g., the system 100) may perform or may be configured to perform the method 1800.

Additionally, or alternatively, one or more components of the memory device (e.g., the controller 130, the memory management component 225, the address translation component 230, the page reservation component 235, and/or the command execution component 240) may perform or may be configured to perform the method 1800. Thus, means for performing the method 1800 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 1800.

As shown in FIG. 18, the method 1800 may include identifying a TU associated with a read command, wherein the TU includes multiple memory pages that span multiple memory planes of the memory device (block 1810). As further shown in FIG. 18, the method 1800 may include identifying an initial memory page of the multiple memory pages of the TU based on a logical-to-physical mapping table, wherein the initial memory page is included in a first memory plane of the multiple memory planes (block 1820). As further shown in FIG. 18, the method 1800 may include determining a plane index value of the first memory plane (block 1830). As further shown in FIG. 18, the method 1800 may include identifying one or more additional memory pages included in the multiple memory pages of the TU based on the initial memory page and based on the plane index value, wherein the one or more additional memory pages are included in one or more additional memory planes of the multiple memory planes (block 1840). As further shown in FIG. 18, the method 1800 may include reading data from the initial memory page and the one or more additional memory pages included in the TU (block 1850).

The method 1800 may include additional aspects, such as any single aspect or any combination of aspects described below and/or described in connection with one or more other methods or operations described elsewhere herein.

In a first aspect, the method 1800 includes determining that the plane index value satisfies a first condition, and identifying the one or more additional memory pages of the TU as one or more sequential memory pages based on determining that the plane index value satisfies the first condition, wherein the initial memory page and the one or more sequential memory pages are sequential.

In a second aspect, alone or in combination with the first aspect, the method 1800 includes refraining from performing a bad block search when identifying the one or more additional memory pages of the TU based on determining that the plane index value satisfies the first condition.

In a third aspect, alone or in combination with one or more of the first and second aspects, the first condition is that the plane index value is an even number.

In a fourth aspect, alone or in combination with one or more of the first through third aspects, the method 1800 includes determining that the plane index value satisfies a second condition, performing a bad block search based on determining that the plane index value satisfies the second condition, and identifying the one or more additional memory pages of the TU based on performing the bad block search.

In a fifth aspect, alone or in combination with one or more of the first through fourth aspects, the second condition is that the plane index value is an odd number.

In a sixth aspect, alone or in combination with one or more of the first through fifth aspects, the method 1800 includes performing, as part of executing a write command to write user data to the TU, a bad block search of a multi-plane page that includes at least a portion of the TU and a next sequential multi-plane page, determining, based on performing the bad block search, whether the multi-plane page includes any bad blocks and whether the next sequential multi-plane page includes any bad blocks, selecting the first memory plane to which the user data is to be written in the initial memory page based on determining whether the multi-plane page includes any bad blocks and based on determining whether the next sequential multi-plane page includes any bad blocks, and storing an indication of the initial memory page in the logical-to-physical mapping table.

In a seventh aspect, alone or in combination with one or more of the first through sixth aspects, the method 1800 includes selecting an even-numbered memory plane as the first memory plane based on a determination that the multi-plane page does not include any bad blocks and based on a determination that the next sequential multi-plane page does not include any bad blocks.

In an eighth aspect, alone or in combination with one or more of the first through seventh aspects, the method 1800 includes refraining from reserving any memory pages of the multi-plane page and the next sequential multi-plane page based on a determination that the multi-plane page does not include any bad blocks and based on a determination that the next sequential multi-plane page does not include any bad blocks.

In a ninth aspect, alone or in combination with one or more of the first through eighth aspects, the method 1800 includes selecting an odd-numbered memory plane as the first memory plane based on a determination that the multi-plane page includes a bad block or based on a determination that the next sequential multi-plane page includes a bad block.

In a tenth aspect, alone or in combination with one or more of the first through ninth aspects, the method 1800 includes reserving one or more memory pages of the multi-plane page or the next sequential multi-plane page based on a determination that the multi-plane page includes a bad block or based on a determination that the next sequential multi-plane page includes a bad block.

Although FIG. 18 shows example blocks of a method 1800, in some implementations, the method 1800 may include additional blocks, fewer blocks, different blocks, or differently arranged blocks than those depicted in FIG. 18. Additionally, or alternatively, two or more of the blocks of the method 1800 may be performed in parallel. The method 1800 is an example of one method that may be performed by one or more devices described herein. These one or more devices may perform or may be configured to perform one or more other methods based on operations described herein.

Figure 19:
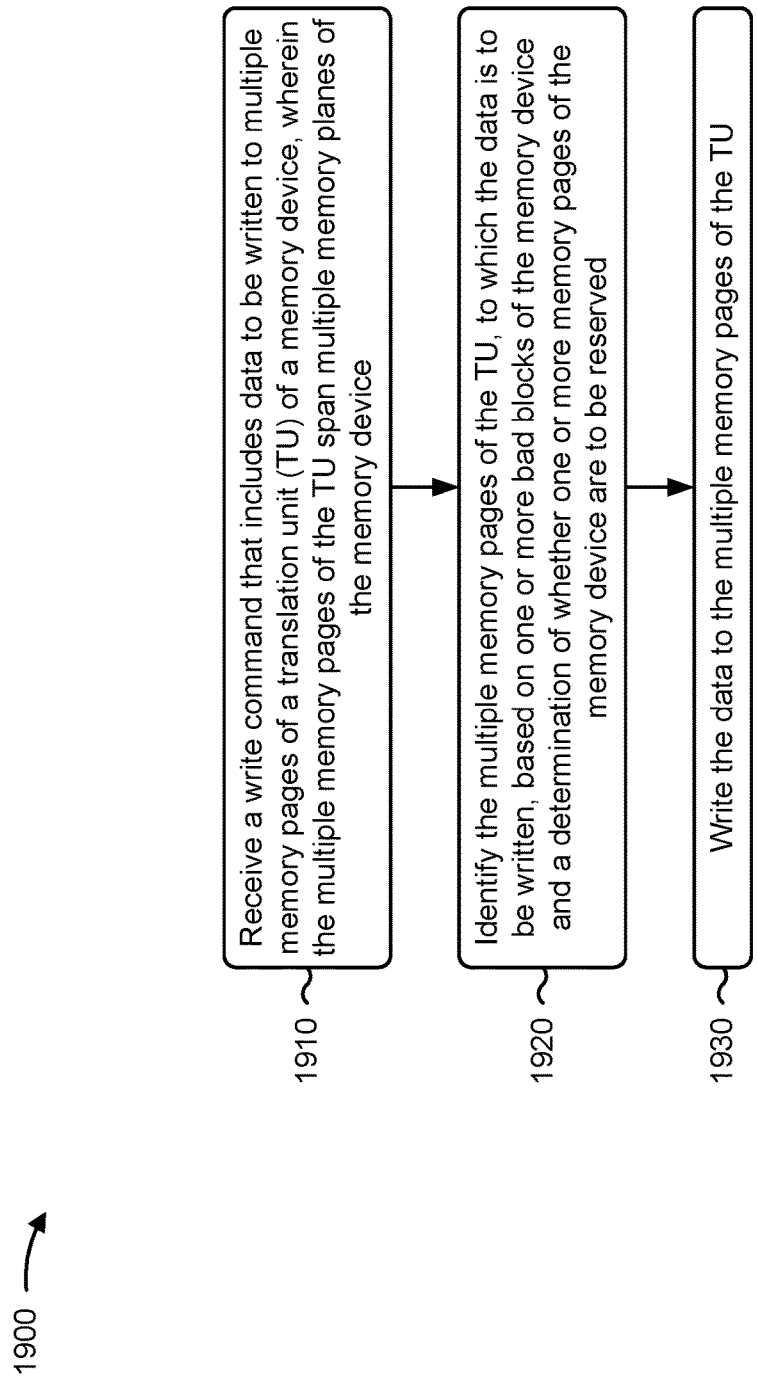

FIG. 19 is a flowchart of an example method 1900 associated with read and write address translation using reserved memory pages for multi-page translation units. In some implementations, a memory device (e.g., the memory device 120) may perform or may be configured to perform the method 1900. In some implementations, another device or a group of devices separate from or including the memory device (e.g., the system 100) may perform or may be configured to perform the method 1900. Additionally, or alternatively, one or more components of the memory device (e.g., the controller 130, the memory management component 225, the address translation component 230, the page reservation component 235, and/or the command execution component 240) may perform or may be configured to perform the method 1900. Thus, means for performing the method 1900 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 1900.

As shown in FIG. 19, the method 1900 may include receiving a write command that includes data to be written to multiple memory pages of a TU of the memory device, wherein the multiple memory pages of the TU span multiple memory planes of the memory device (block 1910). As further shown in FIG. 19, the method 1900 may include identifying the multiple memory pages of the TU, to which the data is to be written, based on: one or more bad blocks of the memory device, and a determination of whether one or more memory pages of the memory device are to be reserved (block 1920). As further shown in FIG. 19, the method 1900 may include writing the data to the multiple memory pages of the TU (block 1930).

The method 1900 may include additional aspects, such as any single aspect or any combination of aspects described below and/or described in connection with one or more other methods or operations described elsewhere herein.

In a first aspect, a data structure that indicates the one or more bad blocks is stored in memory of the memory device, and wherein a configuration of the one or more memory pages that are to be reserved is stored in the memory of the memory device and is based on the one or more bad blocks.

In a second aspect, alone or in combination with the first aspect, the method 1900 includes detecting a new bad block, storing an indication of the new bad block in the data structure, and modifying the configuration of the one or more memory pages that are to be reserved based on detecting the new bad block.

In a third aspect, alone or in combination with one or more of the first and second aspects, the method 1900 includes identifying a multi-plane page that includes an initial memory page of the multiple memory pages of the TU, determining that the multi-plane page does not include any bad blocks of the one or more bad blocks, determining that a next sequential multi-plane page, that follows the multi-plane page, does not include any bad blocks of the one or more bad blocks, refraining from reserving any memory pages of the multi-plane page and refraining from reserving any memory pages of the next sequential multi-plane page based on determining that the multi-plane page does not include any bad blocks and based on determining that the next sequential multi-plane page does not include any bad blocks, and selecting sequential memory pages as the multiple memory pages based on determining that the multi-plane page does not include any bad blocks and based on determining that the next sequential multi-plane page does not include any bad blocks, wherein the sequential memory pages include one of a single set of sequential memory pages that are all included in the multi-plane page, or a first set of sequential memory pages included in the multi-plane page and a second set of sequential memory pages included in the next sequential multi-plane page.

In a fourth aspect, alone or in combination with one or more of the first through third aspects, the memory device is permitted to write to the first set of sequential memory pages included in the multi-plane page and the second set of sequential memory pages included in the next sequential multi-plane page only if a quantity of planes, included in a die of the memory device to be written, is not a power of two.

In a fifth aspect, alone or in combination with one or more of the first through fourth aspects, the method 1900 includes identifying a multi-plane page that includes an initial memory page of the multiple memory pages of the TU, determining that the multi-plane page includes a bad block of the one or more bad blocks or that a next sequential multi-plane page, that follows the multi-plane page, includes a bad block of the one or more bad blocks, reserving at least one memory page of the multi-plane page based on determining that the multi-plane page includes a bad block or that the next sequential multi-plane page includes a bad block, and selecting a set of memory pages, included in the multi-plane page, as the multiple memory pages based on reserving at least one memory page of the multi-plane page, wherein the set of memory pages does not include the at least one memory page that is reserved.

In a sixth aspect, alone or in combination with one or more of the first through fifth aspects, the at least one memory page is reserved to cause an index value, of the initial memory page or of a memory plane that includes the initial memory page, to satisfy a condition, or the at least one memory page is reserved at an end of the multi-plane page when a quantity of unwritten memory pages at the end of the multi-plane page is less than a quantity of memory pages per TU.

Although FIG. 19 shows example blocks of a method 1900, in some implementations, the method 1900 may include additional blocks, fewer blocks, different blocks, or differently arranged blocks than those depicted in FIG. 19. Additionally, or alternatively, two or more of the blocks of the method 1900 may be performed in parallel. The method 1900 is an example of one method that may be performed by one or more devices described herein. These one or more devices may perform or may be configured to perform one or more other methods based on operations described herein.

Figure 20:
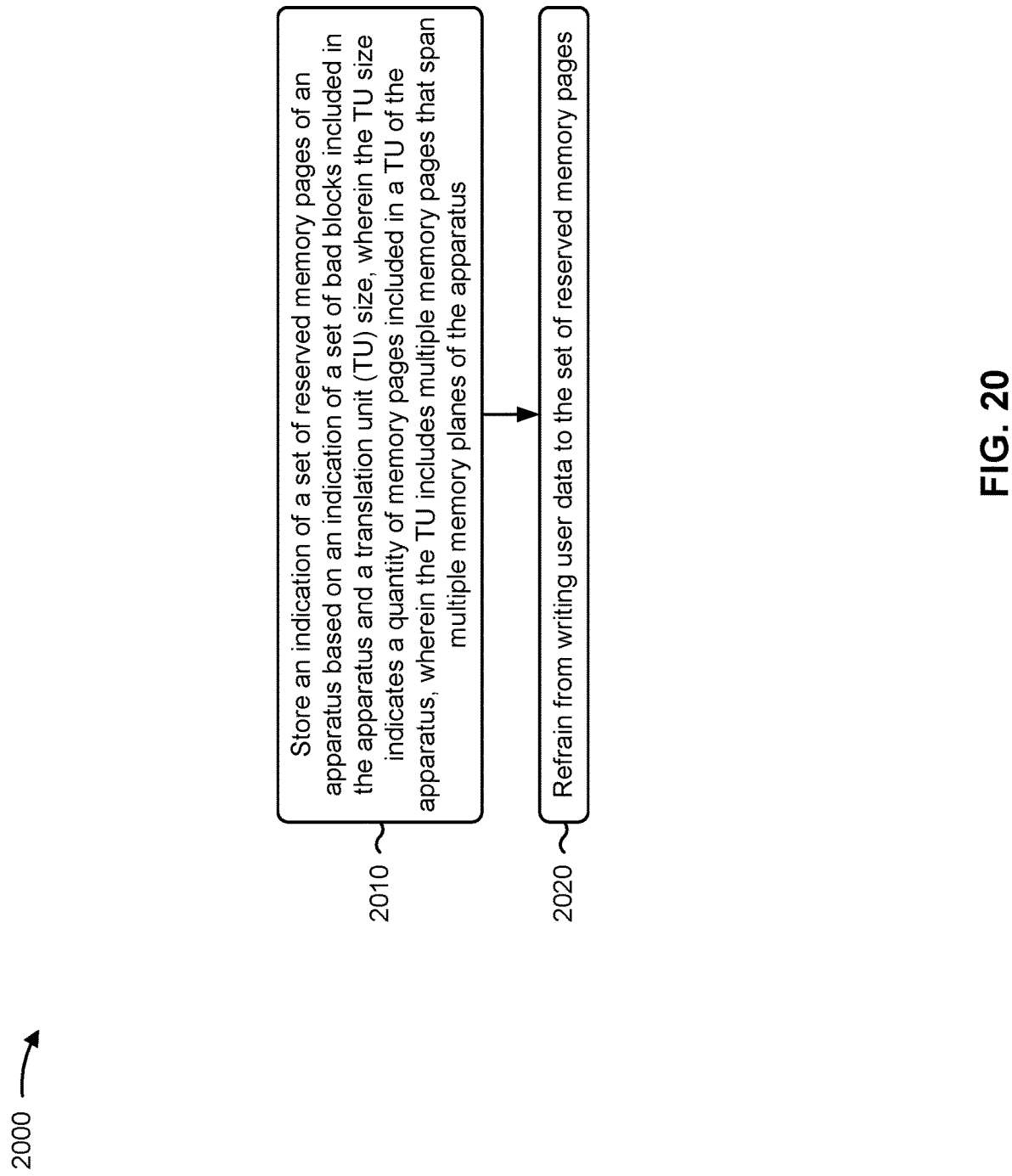

FIG. 20 is a flowchart of an example method 2000 associated with read and write address translation using reserved memory pages for multi-page translation units. In some implementations, a memory device (e.g., the memory device 120) may perform or may be configured to perform the method 2000. In some implementations, another device or a group of devices separate from or including the memory device (e.g., the system 100) may perform or may be configured to perform the method 2000.

Additionally, or alternatively, one or more components of the memory device (e.g., the controller 130, the memory management component 225, the address translation component 230, the page reservation component 235, and/or the command execution component 240) may perform or may be configured to perform the method 2000. Thus, means for performing the method 2000 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 2000.

As shown in FIG. 20, the method 2000 may include storing an indication of a set of reserved memory pages of the apparatus based on an indication of a set of bad blocks included in the apparatus and a TU size, wherein the TU size indicates a quantity of memory pages included in a TU of the apparatus, wherein the TU includes multiple memory pages that span multiple memory planes of the apparatus (block 2010). As further shown in FIG. 20, the method 2000 may include refraining from writing user data to the set of reserved memory pages (block 2020).

The method 2000 may include additional aspects, such as any single aspect or any combination of aspects described below and/or described in connection with one or more other methods or operations described elsewhere herein.

In a first aspect, the method 2000 includes writing non-user data to the set of reserved memory pages.

In a second aspect, alone or in combination with the first aspect, the non-user data comprises dummy data or parity data.

Although FIG. 20 shows example blocks of a method 2000, in some implementations, the method 2000 may include additional blocks, fewer blocks, different blocks, or differently arranged blocks than those depicted in FIG. 20. Additionally, or alternatively, two or more of the blocks of the method 2000 may be performed in parallel. The method 2000 is an example of one method that may be performed by one or more devices described herein. These one or more devices may perform or may be configured to perform one or more other methods based on operations described herein.

In some implementations, a memory device includes one or more components configured to: identify a TU associated with a read command, wherein the TU includes multiple memory pages that span multiple memory planes of the memory device; identify an initial memory page of the multiple memory pages of the TU based on a logical-to-physical mapping table; identify one or more additional memory pages of the multiple memory pages of the TU based on the initial memory page and based on at least one of: an indication of one or more bad blocks of the memory device, or an index value that identifies the initial memory page or that identifies a memory plane, of the multiple memory planes, that includes the initial memory page; and read data from the initial memory page and the one or more additional memory pages included in the TU.

In some implementations, a memory device includes one or more components configured to: identify a TU associated with a read command, wherein the TU includes multiple memory pages that span multiple memory planes of the memory device; identify an initial memory page of the multiple memory pages of the TU based on a logical-to-physical mapping table, wherein the initial memory page is included in a first memory plane of the multiple memory planes; identify one or more additional memory pages included in the multiple memory pages of the TU based on the initial memory page and based on an indication of one or more bad blocks of the memory device, wherein the one or more additional memory pages are included in one or more additional memory planes of the multiple memory planes; and read data from the initial memory page and the one or more additional memory pages included in the TU.

In some implementations, a memory device includes one or more components configured to: identify a TU associated with a read command, wherein the TU includes multiple memory pages that span multiple memory planes of the memory device; identify an initial memory page of the multiple memory pages of the TU based on a logical-to-physical mapping table, wherein the initial memory page is included in a first memory plane of the multiple memory planes; determine a plane index value of the first memory plane; identify one or more additional memory pages included in the multiple memory pages of the TU based on the initial memory page and based on the plane index value, wherein the one or more additional memory pages are included in one or more additional memory planes of the multiple memory planes; and read data from the initial memory page and the one or more additional memory pages included in the TU.

In some implementations, a method includes receiving, by a memory device, a write command that includes data to be written to multiple memory pages of a TU of the memory device, wherein the multiple memory pages of the TU span multiple memory planes of the memory device; identifying, by the memory device, the multiple memory pages of the TU, to which the data is to be written, based on: one or more bad blocks of the memory device, and a determination of whether one or more memory pages of the memory device are to be reserved; and writing, by the memory device, the data to the multiple memory pages of the TU.

In some implementations, an apparatus includes means for storing an indication of a set of reserved memory pages of the apparatus based on an indication of a set of bad blocks included in the apparatus and a TU size, wherein the TU size indicates a quantity of memory pages included in a TU of the apparatus, wherein the TU includes multiple memory pages that span multiple memory planes of the apparatus; and means for refraining from writing user data to the set of reserved memory pages.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
   one or more components configured to:
      identify a translation unit (TU) associated with a read command, wherein the TU includes multiple memory pages that span multiple memory planes of the memory device;
      identify an initial memory page of the multiple memory pages of the TU based on a logical-to-physical mapping table, wherein the initial memory page is included in a first memory plane of the multiple memory planes;
      identify one or more additional memory pages included in the multiple memory pages of the TU based on the initial memory page and based on an indication of one or more bad blocks of the memory device,
wherein the one or more additional memory pages are included in one or more additional memory planes of the multiple memory planes, and
wherein the one or more components, to identify the one or more additional memory pages of the TU, are configured to:
identify a first page index value that identifies the initial memory page;
determine, based on the indication of the one or more bad blocks of the memory device, a set of page index values that indicate a set of bad pages of the memory device;
identify a second page index value that is closest to the first page index value out of all page index values, included in the set of page index values, that are greater than the first page index value;
determine whether the second page index value is within an offset threshold of the first page index value; and
identify the one or more additional memory pages of the TU based on whether the second page index value is within the offset threshold of the first page index value; and
read data from the initial memory page and the one or more additional memory pages included in the TU.

2. The memory device of claim 1, wherein all memory pages included in the TU are included in a single multi-plane page stripe and a single multi-plane block stripe.

3. The memory device of claim 1, wherein at least one memory page of the TU is included in a first multi-plane page and at least one other memory page of the TU is included in a second multi-plane page.

4. The memory device of claim 1, wherein all memory pages included in the TU are unreserved memory pages, and
wherein a multi-plane page stripe, that includes the TU, includes one or more reserved memory pages to which user data is not to be written.

5. The memory device of claim 4, wherein the one or more reserved memory pages is a quantity of reserved memory pages, located at an end of the multi-plane page stripe, that is less than a quantity of memory pages included in the TU.

6. The memory device of claim 5, wherein the quantity of reserved memory pages located at the end of the multi-plane page stripe is based on a quantity of bits stored per memory cell included in the multi-plane page stripe.

7. The memory device of claim 4, wherein the one or more components are further configured to:
detect a new bad block of the memory device; and
mark a memory page, of the one or more reserved memory pages, as an unreserved memory page based on detecting the new bad block,
wherein marking the memory page as an unreserved memory page enables the memory device to write user data to the memory page.

8. The memory device of claim 1, wherein the one or more components, to identify the one or more additional memory pages of the TU, are configured to:
identify the one or more additional memory pages of the TU as one or more sequential memory pages based on a determination that the second page index value is not within the offset threshold of the first page index value, wherein the initial memory page and the one or more sequential memory pages have consecutive page index values.

9. The memory device of claim 1, wherein the one or more components, to identify the one or more additional memory pages of the TU, are configured to:
identify the one or more additional memory pages of the TU as one or more non-sequential memory pages based on a determination that the second page index value is within the offset threshold of the first page index value, wherein the initial memory page and the one or more non-sequential memory pages have at least one non-consecutive page index value.

10. The memory device of claim 1, wherein the offset threshold is based on a quantity of memory pages included in the TU.

11. The memory device of claim 1, wherein the indication of the one or more bad blocks of the memory device includes a data structure that stores an indication of a set of page index values corresponding to a set of pages that are included in the one or more bad blocks.

12. The memory device of claim 11, wherein, for memory cells that store two or more bits per memory cell, the data structure stores an indication of only an initial page per plane for each plane that includes a bad block.

13. A memory device, comprising:
one or more components configured to:
identify a translation unit (TU) associated with a read command, wherein the TU includes multiple memory pages that span multiple memory planes of the memory device;
identify an initial memory page of the multiple memory pages of the TU based on a logical-to-physical mapping table, wherein the initial memory page is included in a first memory plane of the multiple memory planes;
determine a plane index value of the first memory plane;
identify one or more additional memory pages included in the multiple memory pages of the TU based on the initial memory page and based on the plane index value,
wherein the one or more additional memory pages are included in one or more additional memory planes of the multiple memory planes, and
wherein the one or more components, to identify the one or more additional memory pages of the TU, are configured to:
determine that the plane index value satisfies a first condition; and
identify the one or more additional memory pages of the TU as one or more sequential memory pages based on determining that the plane index value satisfies the first condition, wherein the initial memory page and the one or more sequential memory pages are sequential; and
read data from the initial memory page and the one or more additional memory pages included in the TU.

14. The memory device of claim 13, wherein the one or more components are further configured to:
refrain from performing a bad block search when identifying the one or more additional memory pages of the TU based on determining that the plane index value satisfies the first condition.

15. The memory device of claim 13, wherein the first condition is that the plane index value is an even number.

16. The memory device of claim 13, wherein all memory pages included in the TU are included in a single multi-plane page stripe and a single multi-plane block stripe.

17. The memory device of claim 13, wherein all memory pages included in the TU are unreserved memory pages, and wherein a multi-plane page stripe, that includes the TU, includes one or more reserved memory pages to which user data is not to be written.

18. A memory device, comprising:
one or more components configured to:
identify a translation unit (TU) associated with a read command, wherein the TU includes multiple memory pages that span multiple memory planes of the memory device;
identify an initial memory page of the multiple memory pages of the TU based on a logical-to-physical mapping table, wherein the initial memory page is included in a first memory plane of the multiple memory planes;
determine a plane index value of the first memory plane;
identify one or more additional memory pages included in the multiple memory pages of the TU based on the initial memory page and based on the plane index value,
wherein the one or more additional memory pages are included in one or more additional memory planes of the multiple memory planes, and
wherein the one or more components, to identify the one or more additional memory pages of the TU, are configured to:
determine that the plane index value satisfies a first condition;
perform a bad block search based on determining that the plane index value satisfies the first condition; and
identify the one or more additional memory pages of the TU based on performing the bad block search; and
read data from the initial memory page and the one or more additional memory pages included in the TU.

19. The memory device of claim 18, wherein the second-first condition is that the plane index value is an odd number.

20. The memory device of claim 18, wherein all memory pages included in the TU are included in a single multi-plane page stripe and a single multi-plane block stripe.

* * * * *